(12) United States Patent
Yoshida

(10) Patent No.: US 9,921,785 B2
(45) Date of Patent: Mar. 20, 2018

(54) ELECTRONIC APPARATUS COMPRISING A MODE WHERE THE ELECTRONIC APPARATUS IS OPERATED AS A STORAGE DEVICE FOR A CONNECTED HOST APPARATUS

(71) Applicant: SEIKO EPSON CORPORATION, Tokyo (JP)

(72) Inventor: Yutaka Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/730,097

(22) Filed: Jun. 3, 2015

(65) Prior Publication Data

US 2015/0355876 A1  Dec. 10, 2015

(30) Foreign Application Priority Data

Jun. 6, 2014  (JP) ................. 2014-117637

(51) Int. Cl.
 *G06F 3/12* (2006.01)
(52) U.S. Cl.
 CPC .......... *G06F 3/1206* (2013.01); *G06F 3/1229* (2013.01); *G06F 3/1236* (2013.01); *G06F 3/1267* (2013.01); *G06F 3/1284* (2013.01)
(58) Field of Classification Search
 CPC .... G06F 3/1225; G06F 3/1206; G06F 3/1267; G06F 3/1236; G06F 3/1229; G06F 3/1284
 USPC ................................ 358/1.15, 1.16
 See application file for complete search history.

(56) References Cited

U.S. PATENT DOCUMENTS

| 8,477,358 | B2 | 7/2013 | Sugimura et al. |
| 2002/0156947 | A1* | 10/2002 | Nishio .................. G06F 9/4411 710/36 |
| 2005/0228979 | A1 | 10/2005 | Senta et al. |
| 2006/0279642 | A1 | 12/2006 | Yoneda |
| 2014/0211256 | A1* | 7/2014 | Hosotsubo ............ G06F 3/1219 358/1.15 |

FOREIGN PATENT DOCUMENTS

| JP | 2002359810 A | 12/2002 |
| JP | 2005-301513 | 10/2005 |
| JP | 2009-266179 | 11/2009 |
| JP | 2012029294 A | 2/2012 |

* cited by examiner

*Primary Examiner* — Eric A Rust
(74) *Attorney, Agent, or Firm* — Workman Nydegger

(57) ABSTRACT

There is provided an electronic apparatus including a connection section that performs connection with a host apparatus and an operation section. The operation section includes at least a first mode and a second mode which is different from the first mode, the first mode of receiving the instruction of the host apparatus to be operated, and the second mode of being operated as a storage of the host apparatus. The operation section causes the second mode to be switched to the first mode in accordance with any one of whether a time when there is no access from the host apparatus exceeds threshold, whether there is a switching access from the host apparatus, and whether there is an extraction instruction from the host apparatus.

7 Claims, 11 Drawing Sheets

BEFORE SET TIME T1 ELAPSES

THIS CAN BE CONNECTED AS PRINTER.  — M1
IF THIS IS NOT CONNECTED AS STORAGE,
PLEASE WAIT A MINUTE.

— 15

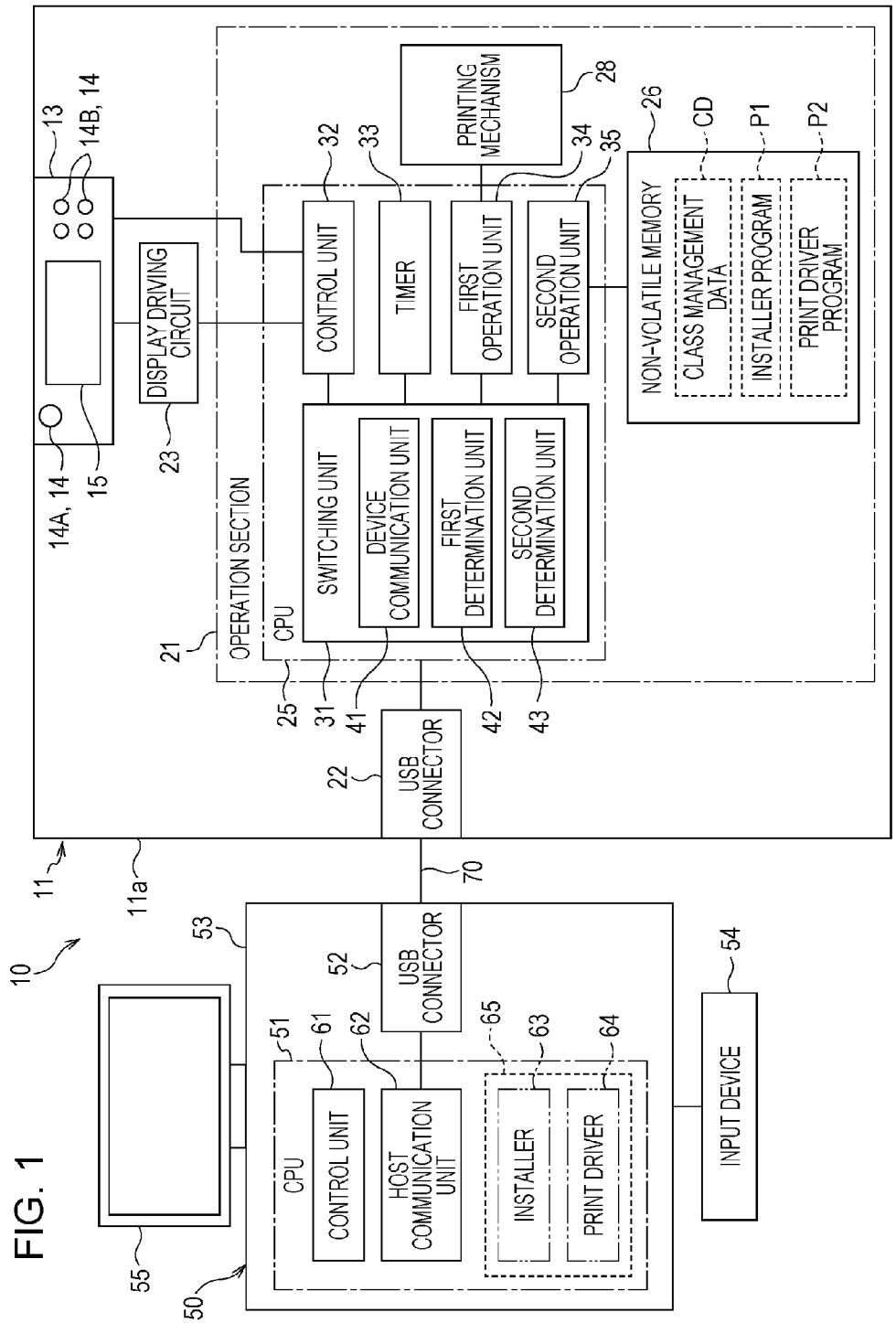

FIG. 2A

BEFORE SET TIME T1 ELAPSES

THIS CAN BE CONNECTED AS PRINTER. — M1
IF THIS IS NOT CONNECTED AS STORAGE,
PLEASE WAIT A MINUTE.
— 15

FIG. 2B

AFTER SET TIME T1 ELAPSES

THIS CAN BE CONNECTED AS STORAGE. — M2
IF THIS IS NOT CONNECTED AS PRINTER,
PLEASE SWITCH CLASS IN CONTROL PANEL
OR PLEASE CONNECT USB CABLE TO THIS — 15
AND THEN APPLY POWER.

ELECTRONIC APPARATUS COMPRISING A MODE WHERE THE ELECTRONIC APPARATUS IS OPERATED AS A STORAGE DEVICE FOR A CONNECTED HOST APPARATUS

CROSS REFERENCES TO RELATED APPLICATIONS

The entire disclosure of Japanese Patent Application No. 2014-117637, filed Jun. 6, 2014 is incorporated by reference herein.

BACKGROUND

1. Technical Field

The present invention relates to an electronic apparatus, a host control device, a system, and a program which are capable of switching a mode operated when connection with a host apparatus is performed.

2. Related Art

For example, a printing apparatus (example of an electronic apparatus) disclosed in JP-A-2009-266179 selects and reads a mass storage class driver when power is on, and then the printing apparatus is recognized as a storage device by a personal computer (PC) which is in a state of being connected to the printing apparatus through a universal serial bus (USB). After plug and play (PnP) communication, the PC receives a switching program from the printing apparatus and starts the received switching program. When a user uses an editor installed on the PC, the printing apparatus needs to be operated as a printing device. Thus, the PC transmits information (driving state information) for switching a driving state of the printing apparatus to the printing apparatus by using the switching program. The printing apparatus selects and reads a printer class driver in order to set the driving state to be a printing device state. That is, the printing apparatus switches a state (second mode) of the storage device to a state (first mode) of the printing device based on the information for switching the driving state.

An electronic apparatus (program built-in device) such as a printer and a digital camera is disclosed in JP-A-2005-301513 and the electronic apparatus uses a device driver to causes the device driver mounted in the program built-in device to be installed. In this electronic apparatus, a camouflage signal transmission unit transmits a camouflage signal which disguises a CD-ROM drive to a PC. A program transfer unit transfers a certain program to the PC, and an installation control unit controls the camouflage signal to be transmitted to the PC and controls a certain program to be transferred to the PC. According to this electronic apparatus, it is possible to borrow a PC at a place where a person goes and to use the device without installing a device driver on the PC in advance.

However, the electronic apparatus disclosed in JP-A-2005-301513 is recognized as a CD-ROM drive by a host apparatus when power is on. For this reason, when a user causes power to be input to the electronic apparatus such that the electronic apparatus performs an original process such as printing, which is to be operated by an instruction from the host apparatus, the electronic apparatus is recognized as the CD-ROM drive by the host apparatus. Thus, it is necessary that the user switches a mode (class) of the CD-ROM drive (to a printer class, for example). However, this requires a manual operation of the user.

On the other hand, in the printing apparatus disclosed in JP-A-2009-266179, the switching program is executed in the host apparatus and the information for switching the driving state is transmitted from the host apparatus to the printing apparatus. Thus, it is possible for the printing apparatus to be switched from the state (second mode) of the storage device to the state (first mode) of the printing device.

However, the switching program is created in order to correspond to a specific operating system (OS) and thus the switching program is not operated in a host apparatus using another OS. For this reason, there is a problem in that it is difficult for the printing apparatus to be switched to a driving state of the printing device in a host apparatus using an OS which does not correspond to the switching program. A switching program for each of various types of OSs may be prepared, but if there are many switching programs, capacity of a memory which is allowable for another use such as a printing process on the printing apparatus side is reduced and an additional process such as a process of selecting a switching program in accordance with the OS in the host apparatus is also required. Accordingly, it is desired to switch a mode (class) of the electronic apparatus without depending on the OS of the host apparatus.

SUMMARY

An advantage of some aspects of the invention is to provide an electronic apparatus, a host control device, a system, and a program that switching from a second mode to a first mode can be performed by an instruction having a weak influence even though the instruction is received from another type of electronic apparatus, the second mode refers to that an electronic apparatus is operated as a storage with respect to a host apparatus, and the first mode refers to that the electronic apparatus receives an instruction of the host apparatus and is operated.

Hereinafter, means of the invention and operation effects thereof will be described.

According to an aspect of the invention, there is provided an electronic apparatus including a connection section that performs connection with a host apparatus and an operation section that receives an instruction of the host apparatus to be operated. The operation section includes at least a first mode and a second mode, the first mode receiving the instruction of the host apparatus to be operated, and the second mode being operated as a storage of the host apparatus. The operation section causes the second mode to be switched to the first mode in accordance with either of whether a time when there is no access from the host apparatus exceeds threshold and whether there is an access which is outside of an operation range of the operation section from the host apparatus and is set as an instruction of mode switching. The access outside of the operation range indicates an access which becomes an error even though the operation section tries to be operated in accordance with the access. Examples of the access include, for example, an access to the outside of the range of the storage, and reception of an extraction command.

According to the configuration, the operation section causes the second mode to be switched to the first mode in accordance with either of whether a time when there is no access from the host apparatus exceeds threshold and whether there is an instruction which is outside of an operation range of the operation section from the host apparatus and is set as an instruction of mode switching. Accordingly, a process is completed with a weak influence on another type of electronic apparatus even though the host apparatus performs the process for the electronic apparatus on another type of electronic apparatus when the host apparatus is connected to another type (for example, another company) of electronic apparatus other than the electronic apparatus.

According to another aspect of the invention, there is provided an electronic apparatus including a connection section that performs connection with a host apparatus and an operation section that receives an instruction of the host apparatus to be operated. The operation section includes at least a first mode and a second mode, the first mode receiving the instruction of the host apparatus to be operated, and the second mode being operated as a storage of the host apparatus. The operation section causes the second mode to be switched to the first mode in accordance with any one of whether a time when there is no access from the host apparatus exceeds threshold, whether there is an access to the outside of a range of the storage from the host apparatus, and whether there is an extraction instruction from the host apparatus.

According to the configuration, the operation section causes the second mode of the electronic apparatus to be switched to the first mode in accordance with any one of whether a time when there is no access from the host apparatus exceeds threshold, whether there is an access to the outside of a range of the storage from the host apparatus, and whether there is an extraction instruction from the host apparatus. Even though an access to the outside of the range of the storage is performed on another type (for example, another company) of electronic apparatus, the access is an access to the outside of the range of the storage and thus a process is completed with a weak influence on another type of electronic apparatus. For example, another type of electronic apparatus completes an operation by only transmitting a response (for example, "Out of Range") indicating that the electronic apparatus is out of the range of the storage to the host apparatus. In a case of the extraction instruction, another type of electronic apparatus completes an operation by only extracting the extraction device even though another type of electronic apparatus includes an extraction device which is a target receiving the extraction instruction. Accordingly, an operation is also completed with a weak influence on another type of electronic apparatus in this case.

In the electronic apparatus, the access to the outside of the range of the storage may correspond to a reading instruction.

According to the configuration, the access to the outside of the range of the storage corresponds to a reading instruction and thus an operation is completed with a weak influence on another type of electronic apparatus even though the operation for another type of electronic apparatus is performed. For example, an operation is completed by only transmitting a response of "Out of Range". Even though an access position is in the range of the storage, this access is only for reading data and thus it is possible to avoid an inconvenience of updating data of the storage and the like in comparison to a writing instruction "Write" or a verification instruction "Verify".

In the electronic apparatus, the operation section may transmit information regarding the range of the storage to the host apparatus if there is an access for inquiring the range of the storage from the host apparatus. The operation section may cause a mode to be switched to the first mode if there is the access to the outside of the range of the storage from the host apparatus after transmission.

According to the configuration, the operation section transmits the information regarding the range of the storage to the host apparatus if there is an access for inquiring the range of the storage from the host apparatus. Thus, the operation section causes the mode to be switched to the first mode if there is the access to the outside of the rage of the storage from the host apparatus after transmission. Accordingly, it is possible to further reliably perform the access to the outside of the range of the storage from the host apparatus. Even if the host apparatus transmits a mode switching instruction to another electronic apparatus which is not expected due to a certain cause, an access to another electronic apparatus corresponds to the access to the outside of the range of the storage and thus it is possible to further reliably reduce an influence on another electronic apparatus.

In the electronic apparatus, the operation section may be operated in the second mode in a case where the electronic apparatus is connected to the host apparatus after a predetermined amount of time from the start of the electronic apparatus elapses. The second mode may be switched to the first mode if a time when there is no access from the host apparatus exceeds threshold in the second mode.

According to the configuration, the operation section is operated in the second mode in a case where the electronic apparatus is connected to the host apparatus after a predetermined amount of time from the start of the electronic apparatus elapses, and the second mode is switched to the first mode if a time when there is no access from the host apparatus exceeds threshold in the second mode. Thus, even though the second mode is selected and an operation is performed in the second mode by determination of the operation section without handling of a user, when the user does not perform an access to the storage of the electronic apparatus from the host apparatus, the second mode of the electronic apparatus may be switched to the first mode if a time when there is no access from the host apparatus exceeds threshold in the second mode.

The electronic apparatus may further include a manipulation section that is handled so as to instruct the operation section. In the electronic apparatus, the operation section may be operated in the first mode when the operation section is in an initial state where the electronic apparatus starts to be operated, and the mode may be switched in accordance with an instruction received through handling of the manipulation section.

According to the configuration, the operation section may be operated in the first mode when the operation section is in an initial state where the electronic apparatus starts to be operated. If a user does not perform handling for switching the mode on the manipulation section, the operation section may receive an instruction of the host apparatus and be operated. When a user wants to operate the operation section as a storage, the mode in the operation section may be switched to the second mode in accordance with an instruction received through the user's handling of the manipulation section and thus it is possible to cause the operation section to be operated as a storage.

The electronic apparatus may further include a memory that includes at least a storage area in which a driver program and an installer of installing the driver program are stored. In the electronic apparatus, the operation section may transmit the installer and the driver program to the host apparatus if an installation request is received from the host apparatus when the operation section is operated in the second mode. The mode is switched to the first mode in accordance with either of whether there is the access to the outside of the range of the storage from the host apparatus and whether there is the extraction instruction from the host apparatus, after installation of a driver by the installer from the host apparatus is completed.

According to the configuration, since the electronic apparatus is operated as a storage in the second mode, if the host apparatus recognizes the electronic apparatus as a storage, a user may access the installer and the print driver program in the storage from the host apparatus. Thus, if the user handles the host apparatus and an installation request is received from the host apparatus, the electronic apparatus transmits the installer to the host apparatus. The host apparatus may install the driver on the host apparatus by the installer transferred from the electronic apparatus. After installation of the driver is completed, the electronic apparatus switches the second mode to the first mode in accordance with either of whether there is the access to the outside of the range of the storage from the host apparatus and whether there is the extraction instruction from the host apparatus. Accordingly, it is possible to operate the electronic apparatus quickly by an instruction from the host apparatus after the driver is installed.

According to still another aspect of the invention, there is provided a host control device which is included in a host apparatus to be connected to the above-described electronic apparatus so as to enable communication including an installer that installs a driver from a storage of the electronic apparatus operated in the second mode, the driver for operating the electronic apparatus which is operated in the first mode in accordance with an instruction of the host apparatus, and the driver that is installed by the installer. The installer performs a mode switching instruction of performing switching to the first mode on the electronic apparatus which is in the second mode after the driver is installed. The mode switching instruction corresponds to an access which is an access outside of an operation range of the operation section from the host apparatus and is set as an instruction of mode switching.

According to the configuration, after the driver is installed, a mode of the operation section in the electronic apparatus may be switched from the second mode to the first mode by the mode switching instruction from the installer. Thus, it is possible to operate the electronic apparatus quickly by an instruction from the host apparatus. At this time, the mode switching instruction corresponds to an access which is an access outside of an operation range of the operation section from the host apparatus and is set as an instruction of mode switching. Thus, even though the installer of the host apparatus performs the mode switching instruction on another type of electronic apparatus when the host apparatus is connected to another type (for example, another company) of electronic apparatus other than the electronic apparatus, the mode switching instruction is completed with a weak influence on another type of electronic apparatus.

According to still another aspect of the invention, there is provided a system including the above-described electronic apparatus and the above-described host control device. According to the configuration, it is possible to obtain effects similar to those of the electronic apparatus and the host control device.

According to still another aspect of the invention, there is provided a program which is executed in a host apparatus which is connected to a storage apparatus. The program may include an inquiry operation of inquiring a storage range of the storage apparatus and a mode switching operation of performing a access as a switching instruction of switching a mode of the storage apparatus on the storage apparatus, the access corresponding to an access to the outside of the range of the storage range of the storage apparatus, which is obtained through the inquiry operation.

According to the configuration, the inquiry operation and the mode switching operation are executed by the host apparatus causing the program to be executed. In the inquiry operation, a storage range of the storage apparatus is inquired. In the mode switching operation, the access as a switching instruction of switching a mode of the storage apparatus on the storage apparatus is performed and the access corresponds to an access to the outside of the range of the storage range of the storage apparatus, which is obtained through the inquiry operation. Accordingly, it is possible to switch a mode of the storage apparatus by an instruction from the host apparatus even though a vendor command is not used in the switching instruction.

BRIEF DESCRIPTION OF THE DRAWINGS

The invention will be described with reference to the accompanying drawings, wherein like numbers reference like elements.

FIG. 1 is a schematic diagram illustrating an electrical configuration and a functional configuration of a host apparatus and a printer in a print system according to a first embodiment.

FIG. 2A is a schematic diagram illustrating a screen before a set time elapses, and FIG. 2B is a schematic diagram illustrating a screen after the set time elapses.

DESCRIPTION OF EXEMPLARY EMBODIMENTS

First Embodiment

Figure 3A:
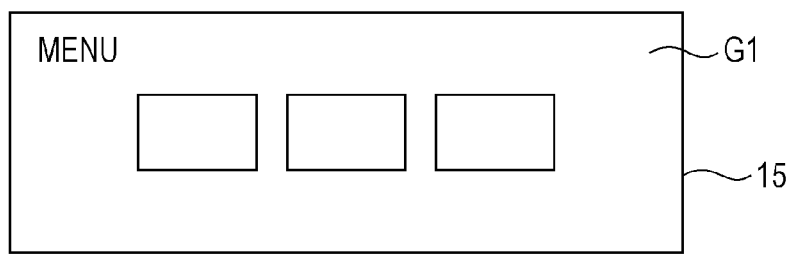
FIGS. 3A to 3D are schematic diagrams illustrating an explanation of a handling method and details of a display section when a simple print driver which is mounted in the printer is installed.

Hereinafter, a first embodiment relating to a printer and a host apparatus constituting a print system will be described with reference to the accompanying drawings.

As illustrated in FIG. 1, the print system 10 includes a printer 11 (printing apparatus) and a host apparatus 50. The printer 11 is an example of an electronic apparatus. The printer 11 is connected to the host apparatus 50 through a communication cable 70 (for example, USB cable) so as to enable communication. The host apparatus 50 is configured from, for example, a personal computer (PC). However, the host apparatus 50 is not limited to the PC and may include a portable information terminal (personal digital assistants (PDA)), a tablet PC, a smartphone, a mobile phone, and the like.

The host apparatus 50 illustrated in FIG. 1 includes a main body 53, an input device 54, and a monitor 55. The main body 53 includes a CPU 51 and a USB connector 52 which constitute a computer. The input device 54 is an example of an input manipulation section which is configured from a keyboard 54A and a mouse 54B (refer to FIG. 5).

As illustrated in FIG. 1, the host apparatus 50 includes a control unit 61, a host communication unit 62, an installer 63, and a print driver 64 as functional components which are constructed in software form by the CPU 51 which executes a program. In this embodiment, the installer 63 and the print driver 64 which are indicated by two-dot chain lines are constructed in the host apparatus by being installed from the printer 11, and the installer 63 and the print driver 64 are installed by an instruction which is generated by a user handling the input device 54, in a state of being connected to the printer 11 so as to enable communication. The installer 63 and the print driver 64 may be read from a compact disc (CD) or be downloaded from a server through the Internet and thus may be installed on the host apparatus 50. In this embodiment, the host control device 65 is configured by the installer 63 and the print driver 64. An example of a system is configured by the printer 11 which is an example of the electronic apparatus and the host control device 65.

As illustrated in FIG. 1, the printer 11 includes a manipulation panel 13 which is provided in a main body 11a. The manipulation panel 13 includes a manipulation section 14 and a display section 15. The display section 15 displays various menus, images, or the like on a screen. The manipulation section 14 includes a power switch 14A and a manipulation switch 14B. The manipulation switch 14B is handled in order to input various instructions and the like to the printer 11. For example, the manipulation switch 14B is handled to select various items in a menu which is displayed on the display section 15 and thus it is possible to perform selection of a mode for determining an operation of the printer 11, selection of a print target, setting of printing condition, and the like.

The printer 11 includes an operation section 21, a USB connector 22, a display driving circuit 23, and the like. The operation section 21 includes a computer which performs the overall control. The USB connector 22 is an example of a connection section which is connected to one end portion (connector) of the communication cable 70 to enable insertion and extraction and another end portion (connector) of the communication cable 70 is connected to the USB connector 52 of the host apparatus 50. The display driving circuit 23 drives the display section 15.

The operation section 21 includes a CPU 25 and a non-volatile memory 26 which constitute a computer. The operation section 21 further includes a printing mechanism 28 which is controlled by the CPU 25 to perform a printing operation. The operation section 21 switches at least two modes and is operated in each of the modes. In this embodiment, a first mode of receiving an instruction from the host apparatus 50 and performing the printing operation and a second mode of being operated as a storage of the host apparatus 50 are included as the modes to be switched. When the operation section 21 is operated as a storage in the second mode, a user handles the input device 54 of the host apparatus 50 and may access a storage configured by at least a portion of a storage area of the non-volatile memory 26 in the printer 11. Thus, the user may confirm storing details of the storage with the monitor 55 of the host apparatus 50 and execute a stored program in the host apparatus, for example.

The printing mechanism 28 in this embodiment includes a print head (not illustrated) and a transporting device (not illustrated). The print head performs recording on a printing medium such as paper, with an ink and the transporting device transports the printing medium. The print head may be a serial head type or a line head type and a recording type of the print head may be any one of an ink jet type, a dot impact type and an electrophotography type. In a case of the ink jet type, a driving element which generates pressure for ejecting an ink may be a piezoelectric element, an electrostatic element, or an electrical heating element. The electrical heating element generates bubbles instantly by using heat and the like. The printing mechanism 28 includes a driving circuit which drives a power source of the transporting device or the print head and the like in accordance with an instruction from the CPU 25.

As illustrated in FIG. 1, the CPU 25 includes a plurality of functional components constructed in software form by executing a program. That is, the CPU 25 includes a switching unit 31, a control unit 32, a timer 33, a first operation section 34 operated in the first mode, and a second operation section 35 operated in the second mode. The switching unit 31 includes a device communication unit 41, and a first determination unit 42 and a second determination unit 43. The device communication unit 41 communicates with the host communication unit 62 which is a USB device and functions as a USB host. The first determination unit 42 and a second determination unit 43 determine the mode. The switching unit 31 has a function to perform switching between the first operation section 34 and the second operation section 35 such that one which is suitable for the mode at that time is operated, when the printer 11 and the host apparatus 50 are connected to each other.

The control unit 32 performs time control of the timer 33 and operation control of the first operation section 34 and the second operation section 35. The control unit 32 receives an input from the manipulation section 14 and performs a control or a process in accordance with input information on the printer 11. The timer 33 is controlled by the control unit 32 and measures an elapsed time (measured time T) from turning-on (start) of the printer 11.

The switching unit 31 communicates with the host apparatus 50 when being connected to the host apparatus 50 through the USB connector 22, and performs a process of switching an operation mode of the printer 11 for the host apparatus 50. The first determination unit 42 determines to be in the first mode before the measured time T of the timer 33 exceeds a set time T1 which is an example of a predetermined time and determines to be in the second mode after the measured time T exceeds the set time T1. The timer measures an elapsed time from a time when the power switch 14A turns ON and the printer 11 starts to be operated. The switching unit 31 causes the first operation section 34 which is set to be operated in the first mode to be operated when connection of the host apparatus 50 is detected before the set time T1 elapses from a start time of the printer 11. The switching unit 31 causes the second operation section 35 which is set to be operated in the second mode to be operated when connection of the host apparatus 50 is detected after the set time T1 elapses from the start time of the printer 11. The switching unit 31 causes the first operation section 34 which is set to be operated in the first mode to be operated when the printer 11 is not connected to the host apparatus 50.

The device communication unit 41 communicates with the host apparatus 50 to perform an initial process which is referred to as enumeration along with the host communication unit 62 when a USB connection with the host apparatus is detected, and the device communication unit 41 transmits configuration information to the host communication unit 62. The configuration information is referred to as descriptor including class information for determining an operation of the printer 11 in the initial process. The class information of the printer 11 is set to be "printer class" when a determination result of the first determination unit 42 indicates the first mode. The class information of the printer 11 is set to be "mass storage class" when the determination result indicates the second mode. The host apparatus 50 recognizes a connection counterpart thereof to be a printer if the class information received from the printer 11 (device communication unit 41) is "printer class". The host apparatus 50 recognizes the connection counterpart thereof to be a storage if the received class information is "mass storage class".

The control unit 32 of the printer 11 monitors the determination result of the first determination unit 42 sequentially and performs display control of switching a message which is displayed on the display section 15, in accordance with before or after the measured time T exceeds the set time T1. As illustrated in FIG. 2A, a message M1 is displayed on the display section 15 before the set time T1 elapses from a turning-on time of the printer 11 and the message M1 indicates that connection as a printer is allowable and wait for connection when there is not connection as a storage.

As illustrated in FIG. 2B, a message M2 is displayed on the display section 15 after the set time T1 elapses from the turning-on time of the printer 11 and the message M2 indicates that connection as a storage is allowable and that when connection as a printer is wanted, switching is performed by handling the manipulation panel 13, or connection to a communication cable is performed and then power is supplied. Thus, when connection as a printer is wanted, a user may handle the manipulation section 14 to perform switching to the first mode or may perform connection to the communication cable 70 and then press the power switch 14A. In this case, even though the power switch 14A is pressed to start an operation and then before the set time T1 elapses, connection to the communication cable 70 is performed, it is possible to cause the printer 11 to be in the first mode and to connect the printer 11 to the host apparatus 50. The message M2 illustrated in FIG. 2B disappears and the screen returns to a general screen (for example, a menu screen G1 in FIG. 3A) when connection of the communication cable 70 is detected or when a predetermined time which is longer than the set time T1 elapses from the start of the printer 11.

In the printer 11 illustrated in FIG. 1, if the determination result of the first determination unit 42 indicates "printer class" (first mode), the control unit 32 starts to operate the first operation section 34. If the determination result of the first determination unit 42 indicates "mass storage class" (second mode), the control unit 32 starts to operate the second operation section 35. In the first mode in which the first operation section 34 is operated, the first operation section 34 controls the printing mechanism 28 and thus the printer is operated as a printing apparatus which is able to perform a printing operation. In the second mode in which the second operation section 35 is operated, the printer 11 is operated as a storage apparatus which has a storage for the host apparatus 50 for which the second operation section 35 sets at least a portion of the storage area in the non-volatile memory 26.

The class information in accordance with each mode determined by the first determination unit 42 is stored as class management data CD in the non-volatile memory 26. An installer program P1 and a print driver program P2 are stored in a storage area of the non-volatile memory 26, which is used as a storage when the printer 11 is operated as a storage when an access to the storage occurs based on a user manipulation from the host apparatus 50. The installer program P1 and the print driver program P2 are to be installed on the host apparatus 50.

When the CPU 51 in the host apparatus 50 receives "printer class" and recognizes the connection counterpart of the host apparatus 50 as a printer, the first operation section 34 starts an operation in the printer 11 and the printer 11 becomes a printable state by the printing mechanism 28. When the CPU 51 in the host apparatus 50 receives "mass storage class" and recognizes the connection counterpart of the host apparatus 50 as a storage, the second operation section 35 starts an operation in the printer 11 and the printer 11 becomes a state of enabling an access to the storage from the host apparatus 50.

If a user specifies a document, an image, and the like which are to be displayed on the monitor 55 of the host apparatus 50, and instructs to perform printing, the print driver 64 in the host apparatus 50 generates print job data and transmits the generated print job data to the printer 11. The printer 11 prints a document, an image, or the like on a printing medium based on the print job data received from the host apparatus 50.

A user can handle the input device 54 of the host apparatus 50 and access the non-volatile memory 26 in the printer 11 to confirm a program and the like using the monitor 55 and then to execute a program and the like which is stored in the non-volatile memory 26. For example, when a print driver corresponding to the printer 11 which is a connection destination is not installed on the host apparatus 50, the user causes the printer 11 to be in the second mode and handles the input device 54 of the host apparatus 50 to access the non-volatile memory 26 in the printer 11. The installer 63 and the print driver 64 may be installed by executing a setup program for a print driver stored in the non-volatile memory 26.

Figure 3B:
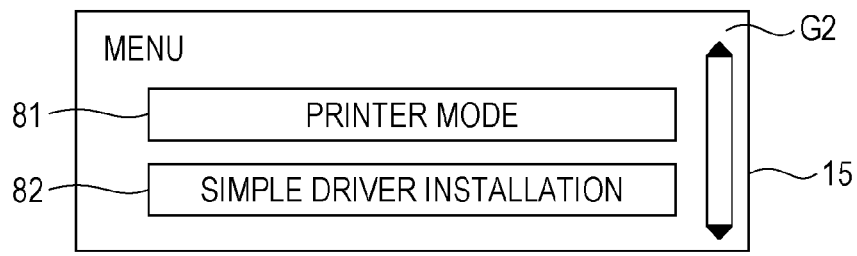
Figure 3C:

When power for the printer 11 is supplied in a state where the communication cable 70 is connected, the printer 11 is operated in the first mode (printer mode). Thus, the menu screen G1 (initial screen) illustrated in FIG. 3A is displayed on the display section 15. At this time, the communication cable 70 may be pulled out and then the power for the printer 11 may be supplied. In addition, the manipulation switch 14B may be handled to switch the mode. For example, the manipulation switch 14B is handled, a submenu of the menu is selected in the menu screen G1 illustrated in FIG. 3A, and then a mode switching screen G2 illustrated in FIG. 3B is displayed. If a second mode button 82 on which "simple driver installation" is inscribed is selected in the mode switching screen G2, the mode is switched to the second mode. Thus, a message screen G3 illustrated in FIG. 3C is displayed on the display section 15. A message M3 of "connect the host apparatus and the USB cable" is displayed in the message screen G3. The printer 11 in the second mode is connected to the host apparatus 50 by using the communication cable 70. The host apparatus 50 recognizes a connection destination as a storage.

Figure 4A:
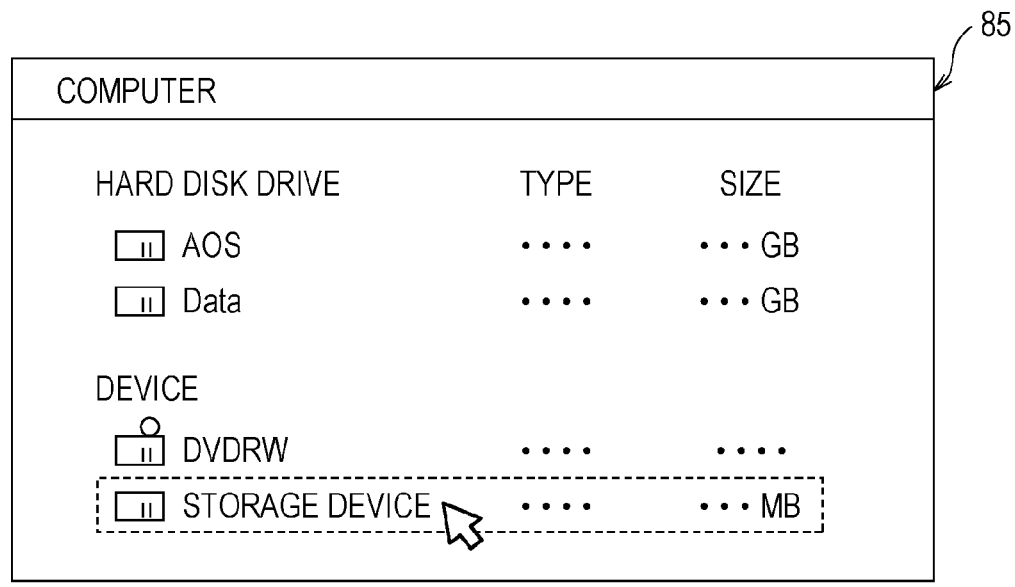
FIGS. 4A and 4B are schematic diagrams illustrating a storage apparatus on the printer side, which is displayed on a display section of the apparatus.
Figure 4B:
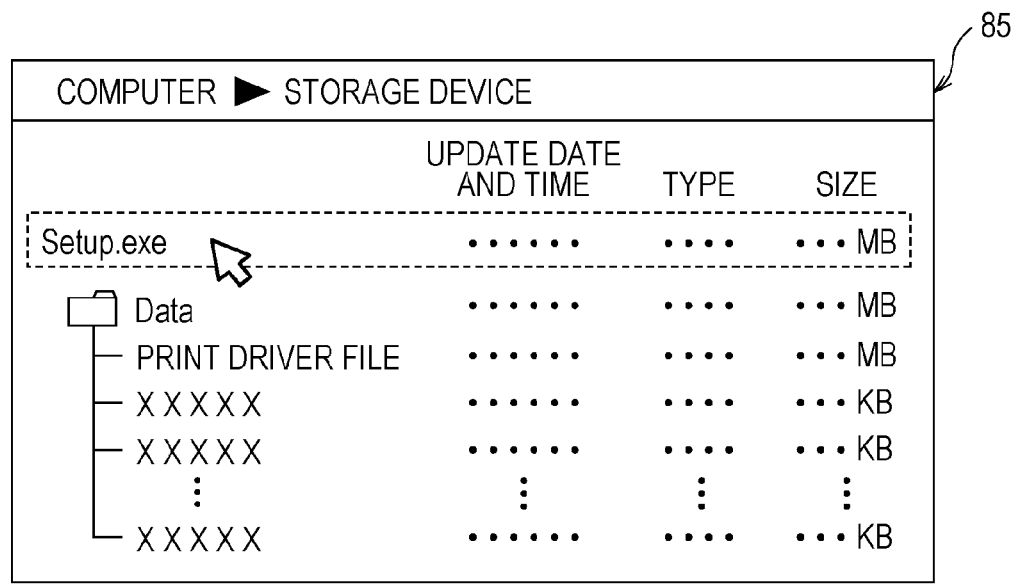

As illustrated in FIG. 4A, the printer 11 recognized as a storage is displayed as, for example, a removable disk on which "storage apparatus" is inscribed, in a file management tool 85 (for example, "Windows (registered trademark) Explorer" which is made by Microsoft corp.) which is displayed on the monitor 55 of the host apparatus 50. In the file management tool 85, if "storage apparatus" is selected (clicked) by handling the mouse 54B as illustrated in FIG. 4A, details (subclass) of "storage apparatus" are displayed, as illustrated in FIG. 4B. "Setup.exe" and a folder of "Data" are included in "storage apparatus". "Setup.exe" includes the installer program P1. A print driver file, various data files, and the like are stored in the folder of "Data", and the print driver file includes the print driver program P2. As illustrated in FIG. 4B, if a user handles the mouse 54B to execute "Setup.exe", an installing process of installing the installer 63 and the print driver 64 on the host apparatus 50 from the printer 11 starts.

Figure 3D:
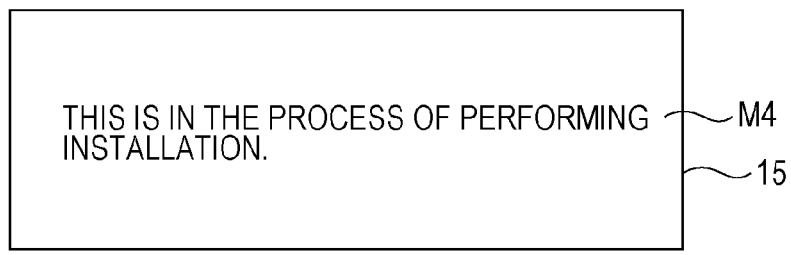
Figure 5:
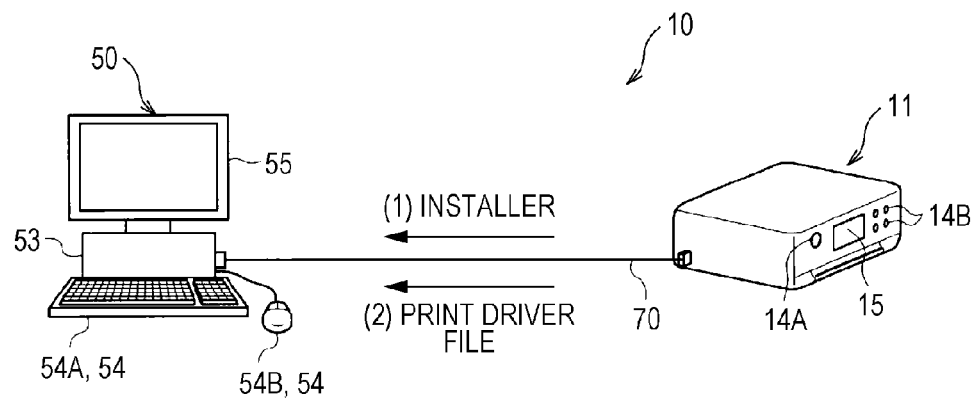
FIG. 5 is a schematic diagram illustrating an installing process of a print driver.

As illustrated in FIG. 5, first, (1) the installer is installed and the installer 63 starting in the host apparatus 50 (2) causes the print driver file and the like to be installed. A message M4 is displayed on the display section 15 during the installing process, as illustrated in FIG. 3D. The message M4 indicates that installation is being performed. If the installation is ended, a screen of the display section 15 returns to the menu screen G1 illustrated in FIG. 3A.

A user supplies power of the printer 11 for printing and after the set time T1 elapses from this start time, the printer 11 is connected to the host apparatus 50 in some cases. At this time, the printer 11 is operated in the second mode, but the user does not access the storage of the printer 11 because the print driver 64 is already installed completely. Thus, the operation section 21 according to this embodiment causes the timer 33 to measure an elapsed time from when starting in the second mode. If a time when there is no access from the host apparatus 50 exceeds threshold T2, the second mode is switched to the first mode. For this reason, it is possible to avoid maintenance of a state of the second mode regardless of a storage using intention of the user and switching to the first mode which is required by the user is performed.

Figure 6:
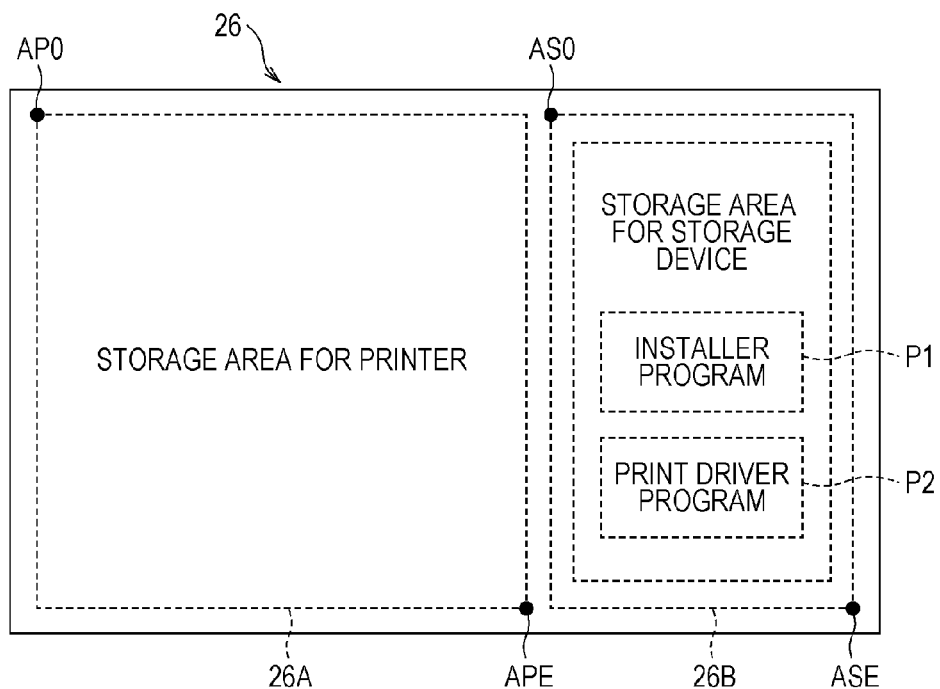
FIG. 6 is a schematic diagram illustrating a storage area in a non-volatile memory.

As illustrated in FIG. 6, in this embodiment, the non-volatile memory 26 includes a storage area for a printer 26A and a storage area for a storage 26B. A program, various data, and the like are stored in the storage area for a printer 26A. The program is illustrated in flowcharts of FIGS. 9 to 11 and is executed by the CPU 25 on the printer 11 side. The various data is necessary when a printing operation is performed. The storage area for a storage 26B refers to an area which is set as a storage enabling an access from the host apparatus 50 in the second mode. Various programs, various data, and the like are stored in the storage area for a storage 26B. The various programs include the installer program P1 and the print driver program P2, and are used by the CPU 51 on the host apparatus 50 side. In this embodiment, as an example, a range of addresses AP0 to APE in the non-volatile memory 26 is allocated to the storage area for a printer 26A and a range of addresses AS0 to ASE is allocated to the storage area for a storage 26B.

In this embodiment, the host apparatus 50 instructs the printer 11 of switching the mode if installation of the print driver 64 is ended. The installer 63 performs this instruction of mode switching. If the mode switching is instructed by a vendor command, a device which is a connection destination when connection to the printer 11 is not performed may perform an inappropriate process due to a vendor command issued by the installer 63 at that time. The installer 63 according to this embodiment instructs to switch the mode by using at least one of two instructing methods, in order to further reliably avoid such an inappropriate process. The two instructing methods except for the vendor command will be described as follows. That is, the mode switching is instructed by at least one of the methods which are (A) accessing the outside of a range of the storage, and (B) transmitting an extraction command.

The CPU 25 of the printer 11 illustrated in FIG. 1 is set to consider (C) a time when there is no access from the host apparatus exceeding the threshold T2, as described above, and processes of (A) and (B) performed by the host apparatus 50 as a mode switching instruction. In detail, the second determination unit 43 illustrated in FIG. 1 determines whether or not a time from when the printer 11 is operated in the second mode exceeds the threshold T2. The second determination unit 43 determines whether or not there is the mode switching instruction from the host apparatus 50 after installation of the print driver is completed. The second determination unit 43 determines the following three operations to be the mode switching instruction. That is, the second determination unit 43 determines that a mode switching condition is satisfied if at least one of the following three operations is established. The three operations are (C) a time from when the printer 11 is operated in the second mode to when there is no access from the host apparatus exceeding the threshold T2, (D) there being an access to the outside of the range of the storage, and (E) receiving the extraction command.

Figure 7:
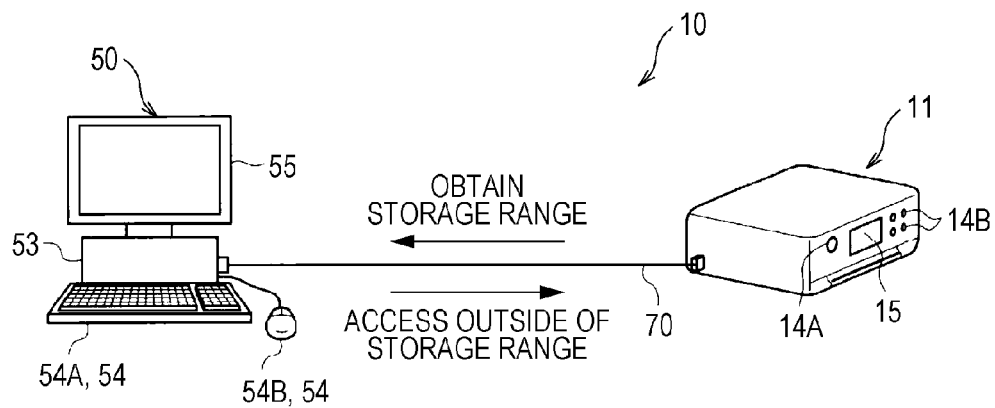
FIG. 7 is a schematic diagram illustrating a mode switching process.

As illustrated in FIG. 7, the installer 63 of the host apparatus 50 transmits an instruction (read capacity) to the printer 11. The instruction is for inquiring a range of the storage when the printer 11 is operated as a storage apparatus. The printer 11 responds to this inquiry and notifies the host apparatus 50 of, for example, the maximum address ASE (refer to FIG. 6) of the non-volatile memory 26 including the storage area for a storage 26B, as information regarding a storage range. The installer 63 of the host apparatus 50 designates a value obtain by adding a predetermined value to a value of the maximum address ASE, as an address and performs an access to the outside of the range of the storage range. The predetermined value is set to a value which is equal to or more than "1". The access refers to "Read" which is an example of a reading instruction. This is because the probability of data update in the non-volatile memory 26 is low compared to "Write" or "Verify". "Write" involves the update of data and "Verify" involves transmission of reference data to the printer 11 side.

A vendor command which is created for the printer 11 of our product may be used. However, when an electronic apparatus of another company is connected to the host apparatus 50, if the vendor command is transmitted to the electronic apparatus of another company due to a certain cause, it is difficult to secure that no inappropriate operation is performed in the electronic apparatus of another company. However, in this embodiment, either of (A) accessing the outside of the range of the storage and (B) transmitting the extraction command is performed, and thus there is no concern of an inappropriate operation being performed in the electronic apparatus. Even if the installer 63 of the host apparatus 50 performs accessing the outside of the range of the storage due to a certain cause in the electronic apparatus of another company as the mode switching instruction, the electronic apparatus of another company returns only an error of "Out of Range" and thus the electronic apparatus is not affected.

In this embodiment, since an access is performed on the outside (in practice, outside of a range of the non-volatile memory 26) of the range of the storage, the access may refer to "Write" or "Verify". In a case of "Read", there is no concern of data update in the non-volatile memory 26 and thus a destination of the access may be in the storage range. Even though an access to the outside of range of the storage is performed, the host apparatus 50 does not perform an inquiry for obtaining a storage range and may access a defined address outside of the known storage range in advance.

The host apparatus 50 includes a program of causing the computer (CPU 51) of the host apparatus 50 to execute an inquiry operation (inquiring step) and a mode switching operation (mode switching step), as a program for constructing the installer 63 which realizes the above-described operation. In the inquiry operation, the host apparatus 50 inquires a storage range of the storage apparatus. In the mode switching operation, an access to the outside of the range of the storage range of the storage apparatus which is obtained through the inquiring operation is performed on the storage apparatus as a switching instruction of switching the mode of the storage apparatus.

Figure 8:
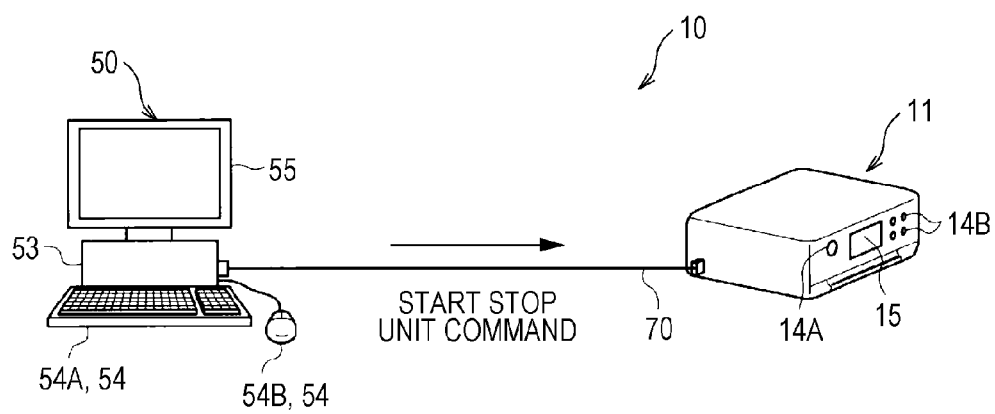
FIG. 8 is a schematic diagram illustrating the mode switching process.

As illustrated in FIG. 8, the installer 63 of the host apparatus 50 transmits an extraction command to the printer 11. In this example, a Start Stop Unit command is transmitted as an example of the extraction command. Using the extraction command causes a concern of a negative influence such as data updating to be reduced since the electronic apparatus of another company returns only an error even though the installer 63 of the host apparatus 50 transmits the extraction command as the mode switching instruction due to a certain cause or only an extraction operation of the extraction device is performed even if an extraction device is included.

The switching unit 31 illustrated in FIG. 1 performs mode switching in which one starting to be operated is switched between the first operation section 34 and the second operation section 35 if there is the mode switching instruction by the determination result of the second determination unit 43. A result of the mode switching is applied to the class management data CD by the switching unit 31.

Figure 9:
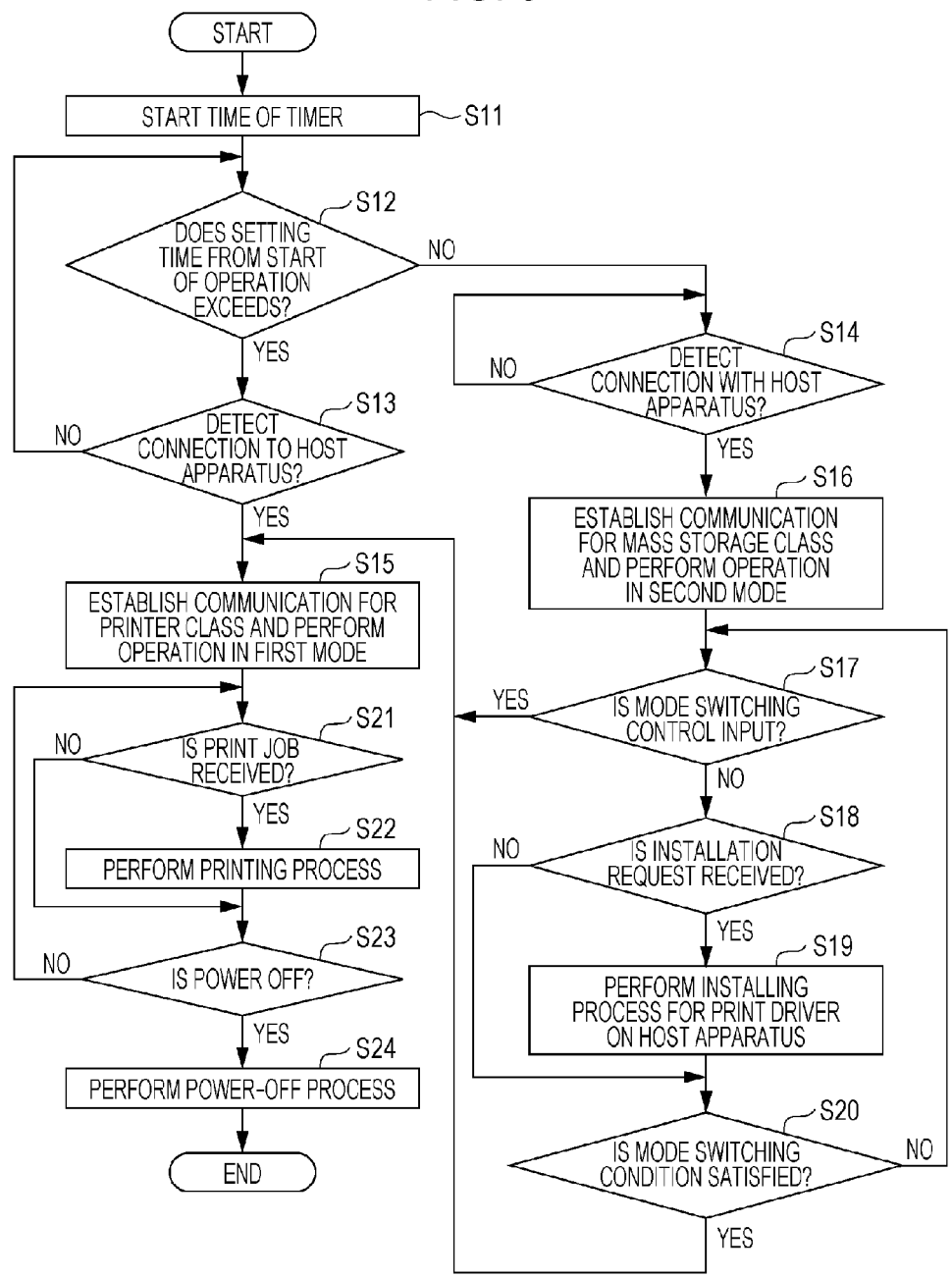
FIG. 9 is a flowchart illustrating a process executed during a time when the printer is operated from start of the printer until the power is turned off.

An operation of the storage apparatus will be described and the storage apparatus is included in a print system 10 and the printer 11 which constitutes the print system 10. First, a process executed by the CPU 25 of the printer 11 will be described with reference to FIGS. 9 to 11. A program illustrated in a flowchart of FIG. 9 is executed by the CPU 25, using start of the printer 11 which is performed by handling the power switch 14A, as a trigger. The process illustrated in FIG. 9 includes a process of determining whether the printer 11 is operated as a printer in the first mode or is operated as a storage in the second mode.

For example, it is assumed that the printer 11 is carried and the printer 11 performs printing by using the host apparatus 50 of a personal computer and the like which is a destination of going out and that reversely, the host apparatus 50 of a personal computer and the like is carried, the printer 11 which is a destination of going out is used, and the printer 11 performs printing by an instruction from the host apparatus 50. In these cases, if a print driver corresponding to the printer 11 is not installed on the host apparatus 50, printing is difficult. Thus, the print driver program P2 and the installer program P1 for installing the print driver are built in the printer 11 according to this embodiment.

The first mode and the second mode are set in the printer 11. In the first mode, the printer 11 is operated as a printer that performs printing on a printing medium such as paper. In the second mode, the printer 11 is operated as a storage of the host apparatus 50 in order to install a print driver on the host apparatus 50. The printer 11 is required to be operated in the second mode in which the printer 11 is operated as a storage of the host apparatus 50, in order to install the print driver. However, if a manipulation which is performed by using the manipulation panel 13 and is for switching the mode to the second mode is forced to a user who is unfamiliar with handling of the printer 11, the user may feel troublesome.

If the printer always starts to be operated in the second mode in order to easily install a print driver, the printer 11 is operated as a storage even though the host apparatus 50 already completes to install the print driver, and the host apparatus 50 recognizes the printer 11 as a storage. Thus, it is difficult to perform printing. The printer 11 according to this embodiment causes the timer 33 to measure an elapsed time from a start time of the printer 11 and the printer 11 is operated in the first mode when connection to the host apparatus 50 is detected before the set time T1 elapses from the start time. When connection to the host apparatus 50 is detected after the set time T1 elapses from the start time of the printer 11, the printer 11 is operated as a storage of the host apparatus 50 in the second mode. A process executed by the printer 11 following the flowchart in FIG. 9 will be described below in detail.

First, in Step S11, a timer starts to measure a time.

In Step S12, it is determined whether or not the time from the start of being operated does not exceed the set time. When the time does not exceed the set time T1, the process proceeds to Step S13 and when the time exceeds the set time T1, the process proceeds to Step S14.

The message M1 illustrated in FIG. 2A is displayed on the display section 15 before an elapsed time from a turning-on time of the printer 11 exceeds the set time T1. The message M1 indicates that the printer 11 can be connected as a printer and that waiting is required when the printer 11 is wanted to be connected as a storage. When connection as a printer is wanted, the printer 11 is connected to the host apparatus 50 during a time when the message M1 illustrated in FIG. 2A is displayed, by using the communication cable 70. After the set time T1 elapses from the turning-on time of the printer 11, the message M2 illustrated in FIG. 2B is displayed on the display section 15. The message M2 indicates that connection as a storage is allowable and that when connection as a printer is wanted, switching is performed by using the manipulation panel, or a USB cable is connected and then power is supplied. For this reason, the user who wants the printer 11 to be connected as a printer in the first mode handles the manipulation switch 14B to switch the mode or the user causes the communication cable 70 to be connected and then presses the power switch 14A. The user who wants the printer 11 to be connected as a storage in the second mode causes connection to the host apparatus 50 to be performed during a time when the message M2 illustrated in FIG. 2B is displayed by using the communication cable 70.

When the printer 11 turns ON in a state where the printer 11 and the host apparatus 50 are connected by using the communication cable 70, the printer 11 is connected in a printer class for the host apparatus 50. At this time, when the print driver is not installed on the host apparatus 50 which is a connection destination, the print driver is required to be installed. If connection is performed in the first mode, a screen of the display section 15 returns to the menu screen (initial screen) illustrated in FIG. 3A from the message M1. At this time, power may be supplied to the printer 11, but the manipulation switch 14B of the manipulation panel 13 may be handled to switch a mode. When the manipulation switch 14B is handled to switch a mode, switching from the second mode to the first mode may be performed in addition to switching from the first mode to the second mode.

For example, as illustrated in FIGS. 3A to 3D, the manipulation switch 14B is handled and a submenu of the menu is selected, and then the menu screen G1 is changed to the mode switching screen G2 illustrated in FIG. 3B. If a first mode button 81 on which "printer mode" is inscribed is selected in the mode switching screen G2, the mode is switched to the first mode. If the second mode button 82 on which "simple driver installation" is inscribed is selected in the mode switching screen G2, the mode is switched to the second mode. Thus, the message screen G3 illustrated in FIG. 3C is displayed on the display section 15. The message M3 of "please connect the host apparatus and the USB cable" is displayed on the message screen G3. Thus, connection to the host apparatus 50 is performed by using the communication cable 70 in a state where the second mode is selected.

In Step S13, it is determined whether or not connection to the host apparatus is detected. When connection to the host apparatus is detected, the process proceeds to Step S15 and when connection to the host apparatus is not detected, the process returns to Step S12.

In Step S14, it is determined whether or not connection to the host apparatus is detected. That is, when connection to the host apparatus is detected before the set time T1 elapses from the start time of the printer 11, the process proceeds to Step S15 and if connection to the host apparatus is not detected, waiting is performed as it is.

Accordingly, when connection to the host apparatus 50 is detected before the set time T1 elapses from the start of the printer 11, the process proceeds to Step S15 and when connection to the host apparatus 50 is detected after the set time T1 elapses from the start of the printer 11, the process proceeds to Step S16.

In Step S15, communication in the printer class is established and an operation in the first mode is performed. That is, the printer 11 is operated as a printer which can perform printing on a medium such as paper based on print job data transmitted from the host apparatus.

In Step S16, communication in the mass storage class is established and an operation in the second mode is performed. That is, the printer 11 is operated as a storage of the host apparatus 50. At this time, the timer 33 starts to measure a time and an elapsed time from when an operation is performed in the second mode is measured. In the second mode, a user may see the printer 11 as the "storage apparatus" in the file management tool 85 displayed on the monitor 55 of the host apparatus 50, as illustrated in FIG. 4A. If the mouse 54B is handled to execute "Setup.exe" in the "storage apparatus", installation of the installer 63 and the print driver 64 on the host apparatus 50 starts from the printer 11. The message M4 as illustrated in FIG. 3D indicating that the installation is being performed is displayed on the display section 15 during the installation.

In Step S17, it is determined whether or not there is a mode switching manipulation. When there is the mode switching manipulation, the process proceeds to Step S15. If there is no mode switching manipulation, the process proceeds to Step S18. For example, when the user wants to perform switching to the first mode and printing, the first mode button 81 illustrated in FIG. 3B is selected by handling the manipulation switch 14B. When the manipulation switch 14B performs the mode switching manipulation, the process proceeds to Step S15. In Step S15, communication in the printer class is established and an operation in the first mode is performed. When the mode is switched in a state where connection to the host apparatus 50 through the communication cable 70 is maintained, 0V is applied to a D+ terminal and a D− terminal to cause a USB connection to be temporarily cut off. If 0V returns to an original potential, the host apparatus detects the USB connection of the device and performs a plug and play process. The printer transmits the class information to the host apparatus during a time when the plug and play process is performed.

In Step S18, it is determined whether or not an installation request is received. The user executes "Setup.exe" in the storage apparatus by handling the mouse 54B in the file management tool 85 displayed on the monitor 55 of the host apparatus 50. The CPU 51 of the host apparatus 50 executes "Setup.exe". The CPU 51 performs an installation request on the storage apparatus (that is, printer 11) (for example, D drive) in a process of executing a program of "Setup.exe". In a determining process of Step S18, it is determined whether or not the installation request is received. When the installation request is received, the process proceeds to Step S19 and when the installation request is not received, the process proceeds to Step S20.

In Step S19, the installing process of the print driver on the host apparatus is performed. The installing process includes a process of transmitting the installer program P1 to host apparatus 50, a process of transmitting the print driver program P2 to the host apparatus 50 in accordance with a request from the installer 63 which starts to be operated in the host apparatus 50. The installing process is performed by the CPU 25 executing an installing process routine on the printer 11 side illustrated in FIG. 10, for example.

In Step S20, it is determined whether or not the mode switching condition is satisfied. In this embodiment, if a time when there is no access, from when an operation in the second mode is performed exceeds the threshold T2, mode switching is instructed. In this embodiment, if installation of the print driver is ended, the installer 63 performs the mode switching instruction by using at least one of the following two operations.

(A) An access to the outside of the range of the storage is performed.

(B) The extraction command is transmitted.

The printer 11 considers the following three operations as the mode switching instructions.

(C) A time from when the printer becomes the second mode to when there is no access exceeds the threshold T2.

(D) There is an access to the outside of the range of the storage.

(E) The extraction command is received.

Figure 11:
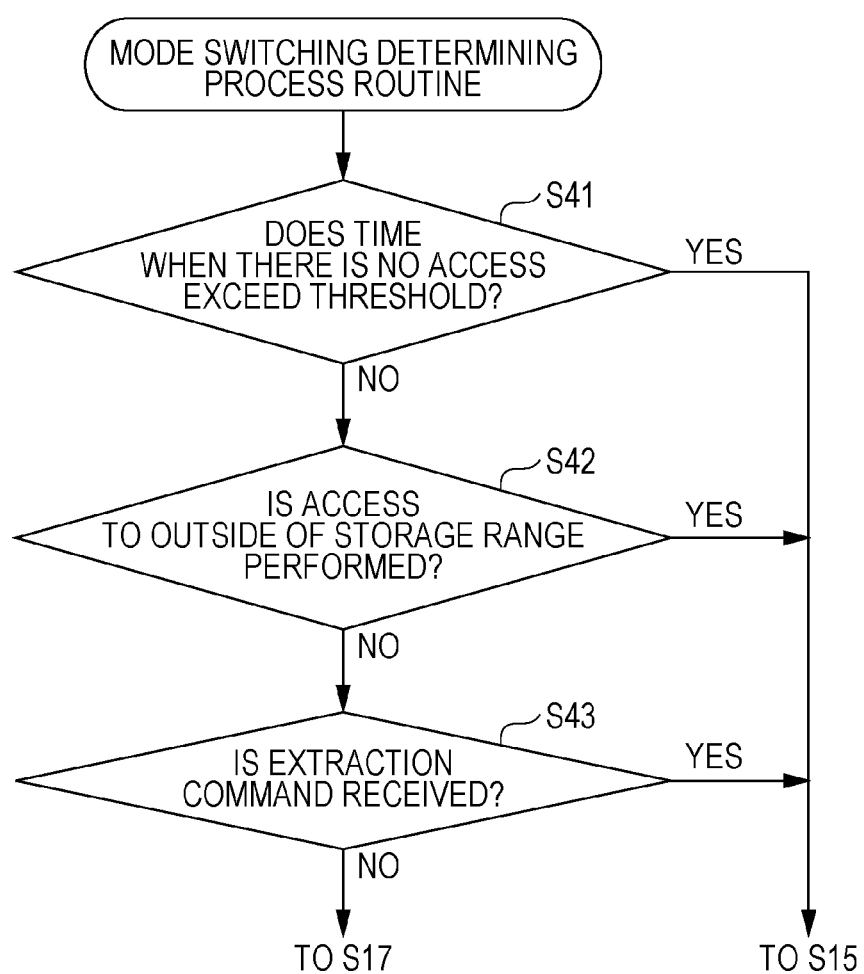
FIG. 11 is a flowchart illustrating a mode switching determining process routine.

The CPU 25 of the printer 11 determines whether or not one of the mode switching conditions of (C) to (E) is satisfied, through a mode switching determining process routine illustrated in FIG. 11. In Step S20, when the mode switching condition is not satisfied, the process returns to Step S17 and when the mode switching condition is satisfied, the process proceeds to Step S15.

For example, if a time when there is no access from the host apparatus in the second mode exceeds threshold T2, the user is considered to have no intention of installation and switching to the first mode is performed (when NO in S18 and YES in S20) even though installation is not performed yet. Either of the processes of (A) and (B) is performed by the installer 63 after installation of the print driver is performed and as a result, either of the mode switching conditions of the (D) and (E) on the printer 11 side is satisfied. In this case, the process proceeds to Step S15 and a switching process to first mode is performed.

At this time, in Step S15, 0V is applied to data lines D+ and D− to temporarily cut off the USB connection and then pulling-up for returning to an original voltage is performed. Thus a process of reconnection is performed. After this reconnection is performed, communication in the printer class is established and an operation in the first mode is performed. The CPU 51 of the host apparatus 50 recognizes a device (printer 11) which is the counterpart of the host apparatus 50 as a printer. The user handles the input device 54 of the host apparatus 50 and may instruct execution of printing in which the printer 11 is designated. The print driver 64 receives an instruction of the execution of the printing, generates print job data (printing job) for printing an image, a document, or the like which is a target of the instruction of the execution of the printing, and transmits the print job data to the printer.

In Step S21, it is determined whether or not a printing job is received. When the printing job is received, the process proceeds to Step S22 and when the printing job is not received, it is determined whether or not a manipulation of power off is input in Step S23. When the manipulation of power off is not input, the process returns to Step S21 and then processes of Steps S21 to S23 are repeated until a printing job is received in Step S21 or until the manipulation of power off is input in Step S23. If a printing job is received in Step S21, a printing process is performed based on the received printing job (S22). In this printing process, the first operation section 34 drives the printing mechanism 28 based on the printing job and thus prints an image and the like based on the printing job on a printing medium such as paper. When the manipulation of power off is input in Step S23, a power-off process is performed in Step S24. As a result, the printer 11 turns off.

Figure 10:
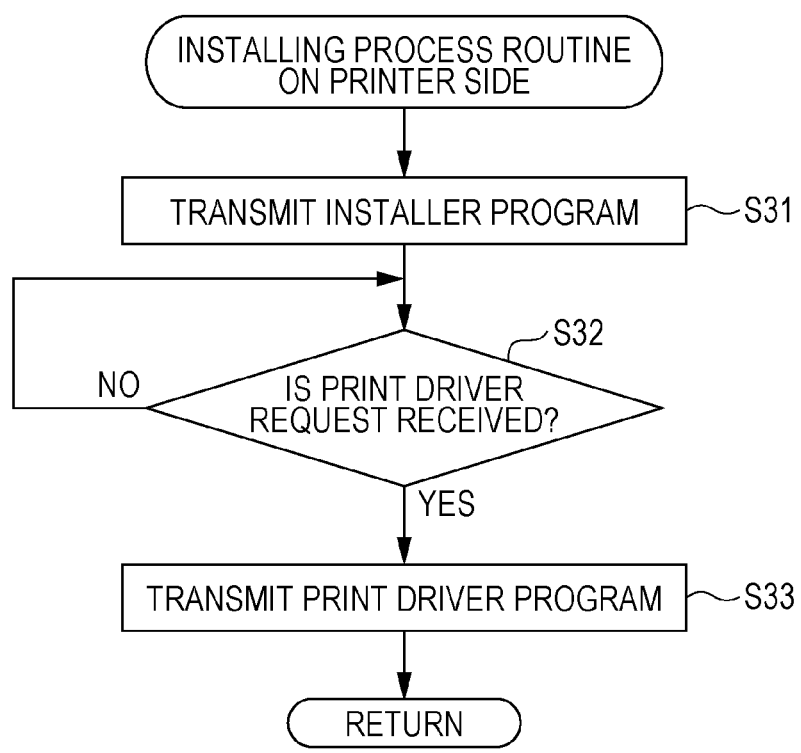
FIG. 10 is a flowchart illustrating an installing process routine on the printer side.

The installing process routine on the printer side will be described with reference to FIG. 10. The installing process routine illustrates the installing process (S19) in FIG. 9 in detail.

First, in Step S31, an installer program is transmitted.

In Step S32, it is determined whether or not a print driver request is received. When the print driver request is not received, waiting is performed until the print driver request is received and when the print driver request is received, the process proceeds to Step S33. In Step S33, a print driver program is transmitted to the host apparatus.

Figure 12:
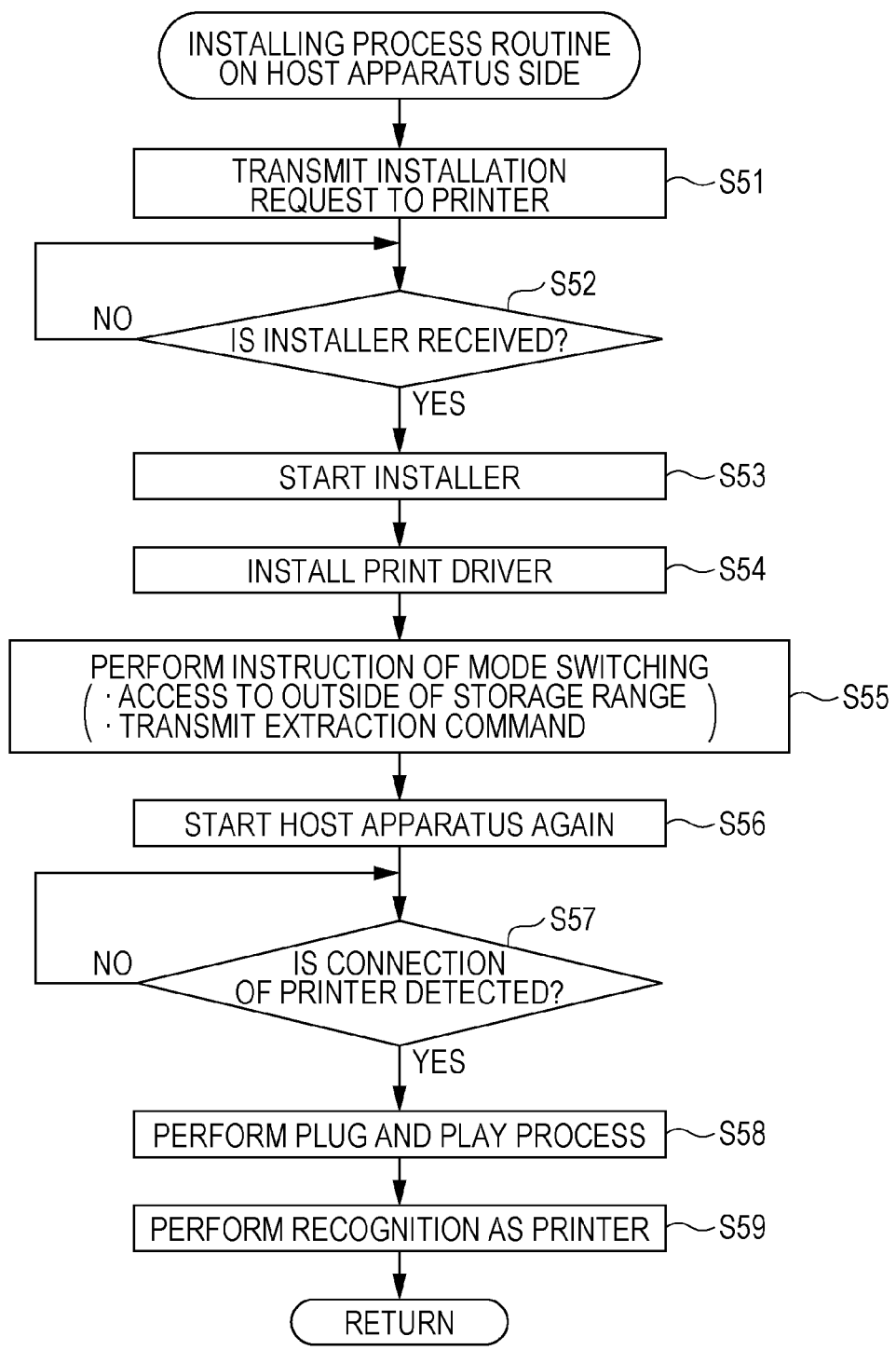
FIG. 12 is a flowchart illustrating an installing process routine on the host apparatus side.

The installing process routine on the host apparatus will be described with reference to FIG. 12.

First, in Step S51, an installation request is transmitted to the printer.

In Step S52, it is determined whether or not an installer (installer program P1) is received. When the installer is not received, waiting is performed as it is and when the installer is received, the process proceeds to Step S53 to start the installer. That is, the CPU 51 of the host apparatus 50 constructs the installer 63 (refer to FIG. 1) to the host apparatus 50 by executing the installer program P1 and starts the installer 63. The installer 63 performs processes of the follow Steps S54 to S56.

In Step S54, a print driver is installed. In this process, first, the print driver request is transmitted on the printer 11. If the print driver program P2 is received from the printer 11, the received print driver program P2 is installed. In this manner, the print driver 64 is installed.

In Step S55, the mode switching instruction is performed. In detail, one of the processes of (A) accessing the outside of the range of the storage and (B) transmitting the extraction command is performed. These two operations may be programmed and one may be selected and performed in accordance with a condition at that time. In addition, only one of these two operations may be programmed. One operation selected in accordance with a condition at that time may be performed. In other words, one of these two operations may be performed. When a model of the printer causes the printer side to be set in such a manner that only one specified operation of the two operations is allowed to be figured out, the two operations may be performed sequentially until a response to the mode switching is received from the printer.

In Step S56, the host apparatus is operated again. That is, the CPU 51 in the host apparatus 50 causes the installed print driver to be effective and thus the host apparatus 50 is operated again.

In Step S57, it is determined whether or not connection of the printer is detected. When connection of the printer is not detected, waiting is performed as it is and when connection of the printer is detected, the process proceeds to Step S58.

In Step S58, the plug and play process is performed. That is, the host apparatus 50 performs the initial process (enumeration) between the host apparatus 50 and the printer 11 and receives the configuration information from the printer 11. The configuration information includes the class information and power current value information. At this time, the printer transmits the printer class as the class information.

In Step S59, recognition as a printer is performed. That is, the host apparatus 50 recognizes the counterpart as the printer based on the class information included in the configuration information which is received from the printer 11.

The mode switching determining process routine will be described with reference to FIG. 11. The mode switching determining process routine illustrates details of a process (S20) of determining whether or not the mode switching condition is satisfied in FIG. 9.

First, in Step S41, it is determined whether or not a time when there is no access from the host apparatus exceeds the threshold T2. When the time when there is no access from the host apparatus exceeds the threshold T2, the process proceeds to Step S15 in FIG. 9 and the second mode is switched to the first mode. When the time when there is no access from the host apparatus does not exceed the threshold T2, the process proceeds to Step S42.

In Step S42, it is determined whether or not there is an access to the outside of the range of the storage from the host apparatus. When there is the access to the outside of the range of the storage from the host apparatus, the process proceeds to Step S15 in FIG. 9 and the second mode is switched to the first mode. When there is no access to the outside of the range of the storage from the host apparatus, the process proceeds to Step S43.

In Step S43, it is determined whether or not the extraction command is received. When the extraction command is received, the process proceeds to Step S15 in FIG. 9 and the second mode is switched to the first mode. When the extraction command is not received, the process proceeds to Step S17 in FIG. 9.

Meanwhile, a connection state in which the printer 11 and the host apparatus 50 are connected through the communication cable 70 remains as it is in many cases. In this case, if power is supplied, the operation section 21 of the printer 11 is operated in the first mode and is recognized as a printer by the host apparatus 50. The user may perform a printing operation on the printer 11 from the host apparatus 50.

When the print driver is not installed on the host apparatus 50, the printer 11 and the host apparatus 50 are not in the connection state in many cases. In this case, if the printer 11 is connected to the host apparatus 50 through the communication cable 70 at a state in which power of the printer 11 is supplied, the set time T1 elapses from the start of the printer 11, and the printer 11 becomes the second mode, the printer 11 is recognized as a storage by the host apparatus 50.

At this time, as a time from when the power is supplied elapses, the messages M1 and M2 are displayed on the display section 15 in this order. Thus, if connection to the host apparatus 50 is performed at a timing at which the message M2 is displayed, the printer 11 which is recognized as a storage in the second mode may be connected to the host apparatus 50.

When the host apparatus 50 and the printer 11 are connected to each other and the power is supplied, the printer 11 starts to be operated in the first mode. However, if the second mode button 82 is selected in the manipulation switch 14B, switching to the second mode may be performed. In this case, a manipulation performed by a user who is unfamiliar with handling of the printer 11 becomes troublesome, and thus after the power is supplied, the printer 11 and the host apparatus 50 may be connected.

When the printer 11 is operated as a storage in this manner, if "Setup.exe" (refer to FIG. 4B) in the "storage apparatus" (refer to FIG. 4A) which is displayed on the monitor 55 of the host apparatus 50 is selected with the mouse 54B and executed, the print driver may be installed on the host apparatus 50.

When connection to the host apparatus 50 is performed after the power of the printer 11 is supplied, a connection timing for being operated in the first mode is figured out by the message M1 displayed on the display section 15. Thus, the printer 11 may be connected to the host apparatus 50 in the first mode. At this time, even though the set time T1 elapses from the start of the printer 11, a connection method in the second mode is reported by the next message M2 displayed on the display section 15. For this reason, the communication cable 70 is connected and the power of the printer 11 is supplied, or the manipulation switch 14B is handled and switching to the second mode is performed in accordance with an instruction in the message M2. Thus, the printer 11 may be connected to the host apparatus 50 in the second mode.

If the installation of the print driver is ended, the installer 63 performs either of the processes of (A) and (B). That is, an instruction of mode switching is transmitted by either of (A) accessing the outside of a range of the storage, and (B) transmitting an extraction command.

The threshold T2 refers to a waiting time until the mode switching is performed before installation is performed in the second mode. The threshold T2 has a predetermined value in a range of 10 seconds to 10 minutes, for example. The value is set to a time sufficient for determining that the user has no intention of installation. The threshold T2 which refers to the waiting time has a predetermined value in a range of 30 second to 5 minutes, preferably. If the threshold T2 is set to a value which is less than 30 seconds, a frequency of the mode of the printer 11 being switched to the first mode becomes relatively high regardless of the user having an intention of installation. If the threshold T2 is set to a value which is more than 5 minutes, the second mode is held excessively long regardless of the user having no intention of installation and thus the user needs to handle the manipulation switch 14B or to supply the power before the threshold T2 elapses, for example, when the user performs printing in a hurry. The threshold T2 which refers to the waiting time in the second mode before installation may be a time which is out of a range of 10 seconds to 10 minutes.

The mode switching instruction which is transmitted to the printer 11 after installation of the print driver is performed by either of (A) accessing the outside of a range of the storage, and (B) transmitting an extraction command. Thus, the mode of the printer 11 may be rapidly switched from the second mode to the first mode without waiting for the above-described waiting time after the installation of the print driver. As a result, a small time of waiting passes after the installation of the print driver and then the print job data is transmitted to the printer 11 from the host apparatus and printing may be performed rapidly.

A vendor command which is created for the printer 11 of our product may be used. However, when the vendor command is transmitted from the host apparatus to another type of electronic apparatus other than our product, which is not assumed to be available, due to a certain cause, it is difficult to secure that there is no occurrence in the electronic apparatus which is not assumed to be available. However, in this embodiment, since either of (A) accessing the outside of the range of the storage and (B) transmitting the extraction command is performed, only an error of "Out of Range" returns even if an access to the outside of the range of the storage is performed on the electronic apparatus which is not assumed to be available. Thus, the electronic apparatus of another company is not affected even though an electronic apparatus of another company is connected to the host apparatus and an access to the outside of the range of the storage occurs.

The installer 63 of the host apparatus 50 transmits an instruction (read capacity) of obtaining a range of the storage to the printer 11 and obtains information on the range of the storage from the printer 11. The installer 63 designates a value obtain by adding a predetermined value to the obtained range of the storage as an address and performs an access to the outside of the storage range. The predetermined value is set to a value which is equal to or more than "1". For this reason, an access to the outside of the storage range may also be performed on an electronic apparatus of another company. The installer 63 may perform an access to the outside of the storage range within a predetermined amount of time from when the information on the range of the storage is obtained. In this case, the printer 11 transmits the information on the range of the storage as a response, in accordance with an instruction of obtaining the range of the storage, and then if there is an access to the outside of the storage range within the predetermined time, the printer 11 performs switching. If there is an access to the outside of the storage range at a time which is out of the predetermined time, the printer 11 does not perform switching. Accordingly, even though there is an access from something other than the installer 63 due to confusion or the like, it is possible not to perform such an access.

In this example, the access to the outside of the storage range refers to "Read". Even though the host apparatus 50 has an intention of performing an access to the outside of the storage range on an electronic apparatus (for example, projector or digital camera) of another company which is not assumed to be available and in practice, an access occurs in the range of the storage of the electronic apparatus, data in the storage is only read. For this reason, update of data which is concerned when "Write" or "Verify" is used has no problem.

As the mode switching instruction, when (c) transmission of the extraction command (Start Stop Unit command) is used, even though an electronic apparatus of another company, which is not assumed to be available, includes an extraction device, only an extraction operation of a tray is performed in the extraction device and thus data is not affected.

According to this embodiment which is described in detail, it is possible to obtain effects as follows.

(1) The operation section 21 includes the first mode of receiving the instruction of the host apparatus 50 to be operated and the second mode of being operated as a storage of the host apparatus 50, and the operation section 21 is operated in the first mode when connection to the host apparatus 50 is performed at a time of start of the printer 11. Accordingly, if the printer 11 starts to be operated in a state where the host apparatus 50 and the printer 11 are connected, the operation section 21 is operated as a printer in the first mode, and thus the printer 11 can receive an instruction of the host apparatus 50 and perform a printing operation. For example, the user wants the printer 11 to perform a printing operation by an instruction from the host apparatus in a state where the host apparatus 50 and the printer 11 are held to be connected and thus if the power of the printer 11 is supplied, the printer 11 may be operated in the first mode in which the printer 11 is operated as a printer, instead of the second mode in which the printer 11 is operated as a storage.

(2) The operation section 21 is operated in the first mode among the first mode of receiving the instruction of the host apparatus to be operated, and the second mode of being operated as a storage of the host apparatus when connection to the host apparatus is performed before a predetermined time elapses from the start of the printer 11. Accordingly, the operation section 21 may be operated in the first mode in which the printer 11 is operated as a printer, instead of the second mode in which the printer 11 is operated as a storage, if connection to the host apparatus 50 is performed before the predetermined time elapses from the start of the printer 11.

(3) The operation section 21 is operated in the second mode when connection to the host apparatus 50 is performed after the set time T1 elapses from the start of the printer 11. Accordingly, if the printer 11 is connected to the host apparatus 50 after the set time elapses from the start of the printer 11, the operation section 21 may be operated in the second mode. For this reason, the printer 11 may be used as a storage of the host apparatus 50.

(4) The operation section 21 performs mode switching in accordance with an instruction received by the user handling the manipulation switch 14B. Accordingly, the user handles the manipulation switch 14B to select either of the first mode button 81 and the second mode button 82 on the display section 15, and thus the mode of the printer 11 may be switched.

(5) There is provided the non-volatile memory 26 for storing the installer program P1 and the print driver program P2. The operation section 21 performs the installing process when the operation section 21 is operated as a storage in the second mode. In the installing process, the installer (installer program P1) is transmitted to the host apparatus 50 in response to a request from the host apparatus and the print driver program P2 is transmitted to the host apparatus 50 in accordance with an instruction of the installer 63 which stars to be operated in the host apparatus 50. Accordingly, the print driver 64 may be installed on the host apparatus 50 from the printer 11 by the installer 63.

(6) The print system 10 includes the printer 11 and the host control device 65. The host control device 65 is included in the host apparatus 50 which is connected to the printer 11 so as to enable communication, and the host control device 65 includes the installer 63 and the print driver 64. The host control device 65 obtains the installer from the printer 11 and starts the installer to install the print driver from the printer 11 if an installation execution instruction is received from the input device 54 of the host apparatus 50 (an example of the input manipulation section). Accordingly, the mode of the operation section 21 of the printer 11 may be switched to the first mode and a printing operation may be performed on the operation section 21 of the printer 11 in accordance with an instruction from the host apparatus 50.

(7) The host control device 65 performs a switching instruction from the second mode to the first mode on the printer 11 if the installing process is ended. Accordingly, the host control device 65 instructs the printer 11 to switch the first mode from the second mode if the installing process is ended. Accordingly, the operation section 21 of the printer 11 may causes the mode to be switched from the second mode to the first mode after the print driver is installed on the host apparatus 50 from the printer 11. As a result, a printing operation which is instructed from the host apparatus 50 may be performed on the operation section 21 of the printer 11, of which the mode is switched to the first mode.

(8) For example, when the installer 63 (installer program P1) for "Windows (registered trademark)" which is an OS made by Microsoft Corp. is created, it is difficult for the installer to be used in a host apparatus (for example, PC) which, for example, uses "MAC (registered trademark) OS" being an OS made by Apple Inc. or a whiteboard (blackboard with a printing function). In this case, if the printer 11 starts to be operated in the second mode which is, for example, the mass storage class, at a time of start of the printer 11, the installer does not start and thus it is difficult for the mode to be switched to the first mode. On the other hand, in the printer 11 according to this embodiment, it is possible to determine whether the printer 11 is operated in the first mode or in the second mode, after start of the printer 11 by the connection timing of the host apparatus 50. For example, even though a state where the host apparatus 50 and the printer 11 are connected to each other by using the communication cable 70 remains as it is, if the power of the printer 11 is supplied, the operation section 21 of the printer 11 may be operated in the first mode (printer mode). Accordingly, when a host apparatus using an OS to which the installer 63 does not correspond or a whiteboard is connected to the printer 11, if connection is performed at a timing after the set time T1 elapses from the start time, the printer 11 may be operated in the first mode. Accordingly, if data is transferred from the host apparatus or the whiteboard to the printer 11, the printer 11 may perform a printing operation based on the data.

(9) The operation section 21 causes the mode to be switched to the first mode when being operated in the second mode, in accordance with either of whether a time when there is no access from the host apparatus 50 exceeds threshold and whether there is an access which is outside of an operation range of the operation section 21 from the host apparatus 50 and is set as an instruction of mode switching. Accordingly, when the host apparatus 50 is connected to an electronic apparatus of another company other than the printer 11, even if the installer 63 performs the mode switching instruction on the electronic apparatus of another company due to a certain cause, the instruction is completed with a weak influence on another type of electronic apparatus.

(10) The operation section 21 causes the mode to be switched to the first mode when being operated in the second mode in accordance with any one of whether a time when there is no access from the host apparatus 50 exceeds threshold, whether there is the access to the outside of a range of the storage from the host apparatus 50, and whether there is the extraction instruction from the host apparatus 50. Accordingly, even if the host apparatus 50 performs the mode switching instruction on the electronic apparatus of another company due to a certain cause, the instruction indicates the access to the outside of the range of the storage, the instruction is completed with a weak influence on the electronic apparatus of another company. For example, the electronic apparatus completes an operation by only transmitting a response (for example, "Out of Range") indicating that the electronic apparatus is out of the range of the storage to the host apparatus 50. In a case of the extraction instruction, even if the electronic apparatus of another company includes an extraction device, the extraction device performs only an extraction operation. Thus, the instruction is also completed with a weak influence on the electronic apparatus of another company in this case.

(11) An access to the outside of the range of the storage refers to a reading instruction (Read). Accordingly, even if the reading instruction to the outside of the range of the storage is performed on the electronic apparatus of another company due to an incorrect operation, the electronic apparatus of another company transmits only a response of, for example, "Out of Range". Thus, the instruction is completed with a weak influence on the electronic apparatus of another company. Even if an intention of accessing the outside of the range of the storage is actually performed to be an access to the inside of the range of the storage, data is only read and thus there is no concern that data is updated on the storage, compared to the writing instruction "Write" or "Verify".

(12) The operation section 21 is operated in the second mode when connection to the host apparatus 50 is performed after the set time T1 elapses from the start of the printer 11. If a time when there is no access from the host apparatus 50 exceeds the threshold in the second mode, the mode of the operation section 21 is switched to the first mode. Accordingly, even though the second mode is selected and an operation in the second mode is performed in accordance with an elapsed time from a time of starting the operation section 21 to a time of performing connection, the user does not access the storage and if the time when there is no access exceeds the threshold, the mode of the printer 11 may be switched to the first mode. For this reason, even though the user does not perform a manipulation of switching the second mode to the first mode, the user may cause the printer 11 to perform printing by an instruction from the host apparatus 50.

(13) The operation section 21 transmits information regarding the range of the storage to the host apparatus 50 if there is an access (Read Capacity) from the host apparatus 50 for inquiring a range of the storage. The operation section 21 causes the mode to be switched to the first mode if there is an access to the outside of the range of the storage from the host apparatus 50 after the transmission. Accordingly, it is possible to further reliably handle an access to the outside of the range of the storage. Even if the host apparatus performs the mode switching instruction on an electronic apparatus of another company due to a certain cause, an access to the outside of the range of the storage is performed on the electronic apparatus of another company and thus the instruction is completed with a weak influence on the electronic apparatus of another company.

(14) The printer 11 includes the non-volatile memory 26 which includes the storage area for the storage 26B. In the storage area for the storage, the print driver program P2 and the installer (installer program P1) for installing the driver program are stored. When the operation section 21 is operated in the second mode, if the installation request is received from the host apparatus 50, the operation section 21 transmits the installer (installer program P1) and the print driver program P2 to the host apparatus 50. After the installation of the print driver 64 by the installer 63 is ended, the operation section 21 causes the mode to be switched to the first mode in accordance with either of whether there is an access to the outside of the range of the storage from the host apparatus 50 and whether there is the extraction instruction from the host apparatus 50. For this reason, the print driver 64 is installed and then quickly print job data may be transmitted from the host apparatus 50 and the printer 11 may perform a printing operation.

(15) The host control device 65 including the host apparatus 50 includes the installer 63 and the print driver 64 which is installed by the installer 63. The installer 63 performs the mode switching instruction on the printer 11 after the installation of the print driver 64 is completed. Accordingly, the operation section 21 of the printer 11 may cause the mode to be switched from the second mode to the first mode. For this reason, quickly print job data may be transmitted from the host apparatus 50 and the printer 11 may perform a printing operation. Before the installation is performed in the second mode, even though a time when the user does not access the printer 11 exceeds the threshold T2, the mode switching instruction is performed. For this reason, for example, when an operation is performed in the second mode unintentionally, if a time when there is no access from the host apparatus 50 to the storage exceeds the threshold T2, the mode is switched to the first mode. After installation is completed, either of accessing the outside of the range of the storage and transmitting the extraction instruction is performed as the mode switching instruction. For this reason, even though the mode switching instruction is performed on an electronic apparatus of another company due to a certain cause when the host apparatus 50 is connected to the electronic apparatus of another company, the instruction is completed with a weak influence on the electronic apparatus of another company.

(16) There is provided the installer program P1 for causing the host apparatus 50 to execute an inquiry operation and the mode switching operation. In the inquiry operation, the storage range of the storage apparatus is inquired. The mode switching operation is performed on the storage apparatus as a switching instruction for switching the modes of the storage apparatus which accesses the outside of the storage range of the storage apparatus obtained through the inquiry operation. Accordingly, even though a vendor command is not used in the switching instruction, the mode of the storage apparatus may be switched by an instruction from the host apparatus 50.

Second Embodiment

Figure 13:
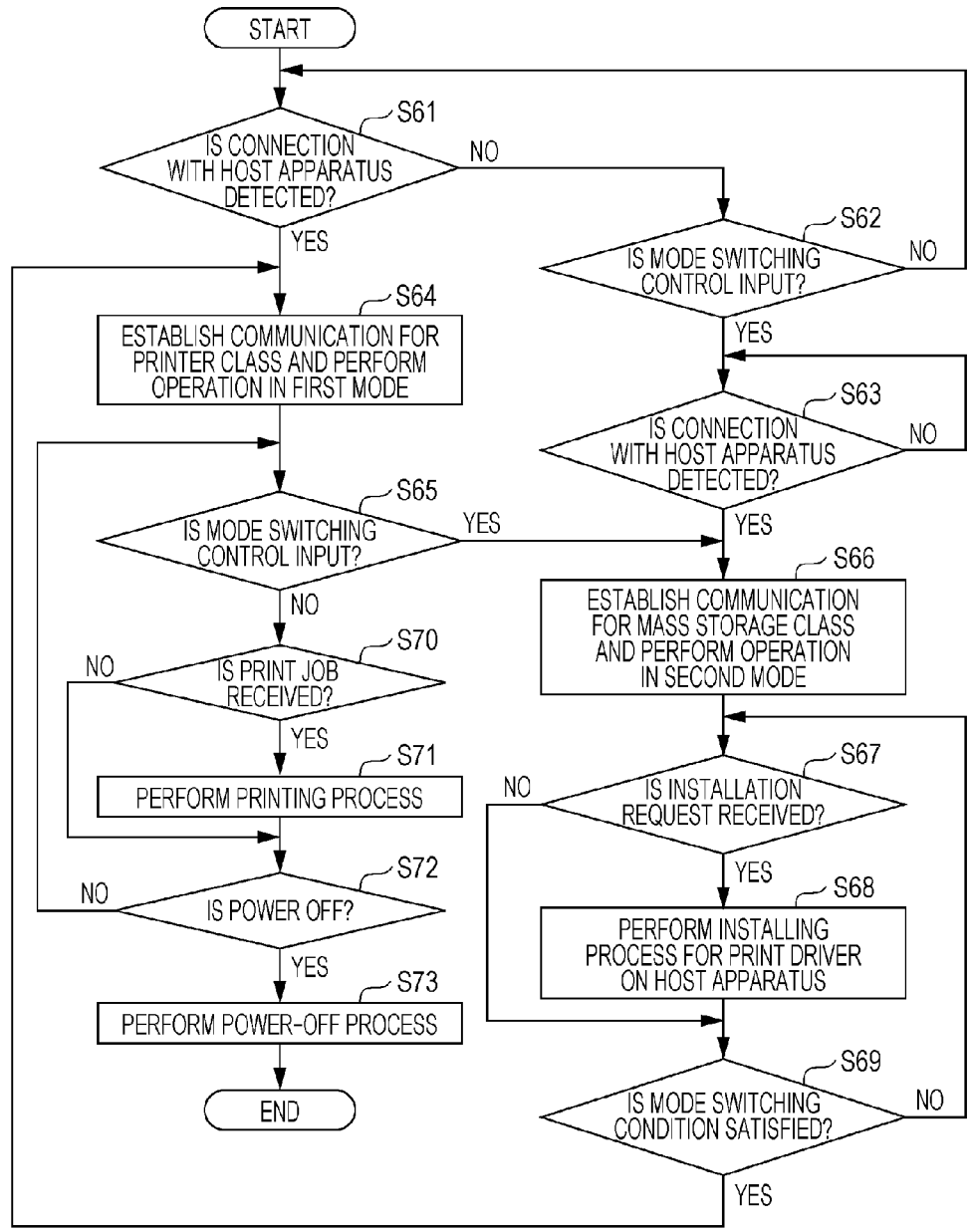
FIG. 13 is a flowchart illustrating a process executed during a time when a printer according to a second embodiment is operated from start of the printer until the power is turned off to turning-off.

A second embodiment will be described with reference to FIG. 13. In the first embodiment, before the measured time T of the timer 33 exceeds the set time T1, the printer 11 is operated in the first mode of the printer class and after the measured time T of the timer 33 exceeds the set time T1, the printer is operated in the second mode of the storage class. The timer 33 measures an elapsed time from the start of the printer 11. On the other hand, in the second embodiment, a user uses the manipulation switch 14B to generate a mode switching manipulation and thus switching from the first mode in which the printer is operated as a printer to the second mode in which the printer is operated as a storage may be performed.

The printer 11 is set to be in the first mode which corresponds to the printer class, in the initial state. When the print driver is installed, the user handles the manipulation switch 14B to display the mode switching screen G2 which is a submenu of the menu screen G1 (FIG. 3A), on the display section 15 and to select the second mode button 82 (refer to FIG. 3B) in the mode switching screen G2 by handling the manipulation switch 14B. As a result, the operation section 21 of the printer 11 causes the mode to be switched from the first mode to the second mode. In this embodiment, an example of the manipulation section in which an instruction is transferred to the operation section through the manipulation switch 14B is included.

Hereinafter, a process in this embodiment will be described with reference to FIG. 13. A configuration of the printer 11 and a configuration of the host apparatus 50 are similar to those in the first embodiment. The process in this embodiment is basically performed similarly to that in the first embodiment and some parts thereof are different from those of the process of FIG. 9 in the first embodiment. Thus, only particularly different parts of the process will be described with reference to FIG. 13.

First, in Step S61, it is determined whether or not connection to the host apparatus is detected. When the connection to the host apparatus is not detected, the process proceeds to Step S62 and when the connection to the host apparatus is detected, the process proceeds to Step S64.

In Step S62, it is determined whether or not there is a mode switching manipulation. That is, in this embodiment, the printer is set to be in the first mode in the initial state and thus it is determined whether or not a switching operation to the second mode is performed by the mode switching manipulation. When there is no mode switching manipulation, the process returns to Step S61 and when there is the mode switching manipulation, the process proceeds to Step S63. The processes of S61 and S62 are repeated from when the connection to the host apparatus is detected in the first mode of the initial state as it is (determination of YES in S61) to when there is the mode switching manipulation to the second mode (determination of YES in S62). If there is the mode switching manipulation to the second mode (determination of YES in S62), the process proceeds to Step S63 and if the connection to the host apparatus is detected in a state of the first mode (determination of YES in S61), the process proceeds to Step S64.

In Step S63, it is determined whether or not the connection to the host apparatus is detected. That is, it is determined whether or not the connection to the host apparatus is detected in a state of the second mode. When the connection to the host apparatus is detected, the process proceeds to Step S66 and when the connection to the host apparatus is not detected, waiting is performed as it is, until a time when the connection to the host apparatus is detected. That is, if both of the mode switching manipulation to the second mode (S62) and detection of the connection to the host apparatus in the state of the second mode (S63) are established, the process proceeds to Step S66.

In Step S64, communication in the printer class is established and an operation is performed in the first mode. That is, when the connection to the host apparatus is detected in the first mode of the initial state as it is, the operation section 21 establishes communication in the printer class through the USB connector 22 and is operated in the first mode.

In Step S65, it is determined whether or not there is the mode switching manipulation. When there is the mode switching manipulation, the process proceeds to Step S66 and when there is no mode switching manipulation, the process proceeds to Step S70.

In Step S66, communication in the mass storage class is established and an operation is performed in the second mode. That is, when the mode switching manipulation is performed after the printer 11 and the host apparatus 50 are connected to each other, communication of the printer 11 in the second mode with the host apparatus is also established in addition to a case where the user performs the mode switching manipulation before the printer 11 and the host apparatus 50 are connected to each other. When there is the mode switching manipulation in Step S65, pulling-up is performed after connection in the first mode is cut off, the plug and play process is started, and the process of Step S66 is performed.

The printer 11 in the second mode is operated as a storage of the host apparatus 50 and may confirm the storage (refer to FIG. 4A) of the printer 11 by using the monitor 55 of the host apparatus 50.

Each of the following processes of Steps S67 to S69 is similar to the details (FIG. 9) of the processes of Steps S18 to S20 in the first embodiment. That is, if the installation request is received (determination of YES in S67), the installing process of the print driver on the host apparatus is performed in Step S68. In Step S69, it is determined whether or not the mode switching condition is satisfied. When the mode switching condition is not satisfied, the process returns to Step S67 and when the mode switching condition is satisfied, the process proceeds to Step S64. In this embodiment, similarly to the first embodiment, if a time when there is no access exceeds the threshold T2 before the installation, the mode of the printer is switched to the first mode. The installer 63 instructs mode switching by either of (A) accessing the outside of the range of the storage and (B) transmitting the extraction command, after the installation of the print driver is completed. The printer 11 causes the mode to be switched from the second mode to the first mode if the mode switching instruction which corresponds to either of (D) the presence of an access to the outside of the range of the storage and (E) the reception of the extraction command is received. When the mode switching instruction is received, pulling-up is performed after the connection in the second mode is cut off, the plug and play process is started, and the process proceeds to Step S64.

Then, the user transmits print job data from the host apparatus 50 to the printer 11. Processes of Steps S70 to S73 are substantially similar to the processes (FIG. 9) of Steps S21 to S24 in the first embodiment. That is, if a printing job is received in Step S70, a printing process is performed (S71). If power turns off, the presence or absence of the mode switching manipulation is determined (S65) and a printing process is performed every time a printing job is received (S70 and S71). If the power turns off (determination of YES in S72), the power-off process is performed (S73).

According to the second embodiment, the following effects are obtained.

(17) The manipulation switch 14B which is handled so as to transmit an instruction to the operation section 21 is provided. The operation section 21 is operated in the first mode in the initial state where the printer 11 starts to be operated. The mode switching is performed in accordance with an instruction transmitted by handling the manipulation switch 14B and thus the mode of the operation section 21 becomes the second mode. Accordingly, even though the user does not perform a manipulation for switching the mode by using the manipulation switch 14B, the operation section 21 is operated in the first mode and may be receive an instruction of the host apparatus 50 to perform a printing operation. The user handles the manipulation switch 14B to switch the mode of the operation section to the second mode and thus the operation section 21 may be operated as a storage.

The above-described embodiments may be changed as follows.

In the embodiments, the two modes of the first mode and the second mode are provided, but three modes or more may be provided. For example, "human interface device (HID) class" may be provided as a third mode. Modes corresponding to other device classes may be further added and thus four modes or five modes may be provided. A combination of the device classes for determining the mode is not limited to the printer class (first mode) and the mass storage class (second mode). For example, a combination of an image class (first mode) and the mass storage class (second mode), a combination of an audio class (first mode) and the mass storage class (second mode), or a combination of a vendor class (first mode) and the mass storage class (second mode) may be included and at least two modes may be set.

The operation section determines the mode for being operated in accordance with before and after the set time T1 elapses from the start of the electronic apparatus. However, the operation section may be configured in such a manner that the operation section is operated in the first mode when the operation section is connected to the host apparatus at a time of starting an operation and is operated in the second mode when the operation section is not connected to the host apparatus at the time of starting an operation. According to this configuration, the user may select whether the operation section is operated in the first mode or whether the operation section is operated in the second mode, in accordance with a selection of whether or not the electronic apparatus is connected to the host apparatus at a time of starting an operation. If the user who uses the electronic apparatus and the host apparatus in a state of continuous connection of these supplies power of the electronic apparatus, the operation section is operated in the first mode. Thus, if an instruction from the host apparatus is received, the operation section of the electronic apparatus may perform an operation determined based on the instruction. After the power of the electronic apparatus is supplied, if the electronic apparatus is connected to the host apparatus, the user may use the electronic apparatus as a storage which is allowed to be accessed by a manipulation from the host apparatus.

The print driver 64 may perform the mode switching instruction from the first mode to the second mode, instead of the installer 63. For example, the host apparatus starts to be operated again after the installation of the driver is completed, and then the print driver 64 starts to be operated. The mode switching instruction may be performed on the print driver which starts to be operated.

A performing time of the mode switching instruction is not limited to a timing after the installation of the driver is completed. For example, the performing time may include a time when a program or a file which has been open in the storage is closed, a time after installation of a program in the storage, other than the driver is completed, and the like.

A method of reporting the connection timing to the host apparatus is not limited to displaying the messages M1 and M2. The connection timing to the host apparatus may be reported with a sound message or by a lamp turning on or off.

The set time T1 may be changed by handling the manipulation switch 14B. The threshold T2 may be changed by handling the manipulation switch 14B.

The processes in FIGS. 9 to 11 and FIG. 13 which are executed by the operation section 21 are implemented as a form of software by the CPU which executes a program. However, the processes may be implemented as a form of hardware by using an electronic circuit such as an ASIC or may be implemented by combining software and hardware.

An access outside of the operation range of the operation section, that is, an access becoming an error when the operation section is operated in accordance with the access from the host apparatus may refer to a command other than the extraction command. In this case, an influence on an electronic apparatus of another company is suppressed compared to a case of using a special command such as a vendor command even though the mode switching instruction is performed on the electronic apparatus of another company due to a certain cause.

USB 2.0, USB 3.0, and USB 3.1 may be applied as the USB standard. USB 1.0 or USB 1.1 may also be applied. The communication standard is not limited to the USB standard and other communication standards may be used. In other words, other communication standards may be used as long as being a communication standard in which the initial process (for example, enumeration) is performed between the host apparatus and the electronic apparatus and the class information is transmitted from the electronic apparatus to the host apparatus in the initial process. For example, IEEE1394, Small Computer System Interface (SCSI), and Advanced Technology Attachment (ATA) may be used. The communication method is not limited to a wired communication method and a wireless communication method may be used.

The printing apparatus is not limited to a print dedicated machine and may be a combined machine including a copy function and a scanner function. The printing apparatus is not limited to a serial printer and a line printer, and may be a page printer. The printing apparatus may be a portable printer, a small-size printer, a mid-size printer, and a large-size printer. For example, a business printer or a printer for a large size sheet may be used.

The electronic apparatus is not limited to a printer (including a combined machine) and may include a scanner, a projector, a digital camera (capturing device), a digital audio device (sound equipment), and the like.

What is claimed is:

1. An electronic apparatus comprising:

a connection section that performs connection with a host apparatus; and an operation section that receives an instruction of the host apparatus to be operated, wherein the operation section includes at least a first mode and a second mode which is different from the first mode, the first mode receiving the instruction of the host apparatus to be operated, and the second mode being operated as a storage of the host apparatus, and the operation section causes the second mode to be switched to the first mode in accordance with whether there is a switching access corresponding to an access to the outside of a range of the storage from the host apparatus, wherein the operation section transmits information regarding the range of the storage to the host apparatus if there is an access for inquiring the range of the storage from the host apparatus, and the operation section considers an access as the switching access and causes the mode to be switched to the first mode if there is the access to the outside of the range of the storage from the host apparatus after transmission.

2. The electronic apparatus according to claim 1, wherein a mode is switched to the first mode in accordance with the switching access to the outside of the range of the storage, the switching access corresponding to a reading instruction.

3. The electronic apparatus according to claim 1, wherein the operation section is operated in the second mode in a case where the electronic apparatus is connected to the host apparatus after a predetermined amount of time from start of the electronic apparatus elapses, and the second mode is switched to the first mode if a time when there is no access from the host apparatus exceeds a threshold in the second mode.

4. The electronic apparatus according to claim 1, further comprising:

a manipulation section that is configured to instruct the operation section, wherein the operation section is operated in the first mode when the operation section is in an initial state where the electronic apparatus starts to be operated, and the mode is switched in accordance with an instruction received through handling of the manipulation section.

5. The electronic apparatus according to claim 1, further comprising:

a memory that includes at least a storage area in which a driver program and an installer of installing the driver program are stored, wherein the operation section transmits the installer and the driver program to the host apparatus if an installation request is received from the host apparatus when the operation section is operated in the second mode, and the mode is switched to the first mode in accordance with either of whether there is the switching access from the host apparatus and whether there is an instruction from the host apparatus to switch the mode, after installation of a driver by the installer from the host apparatus is completed.

6. A host control device which is included in the host apparatus to be connected to the electronic apparatus according to claim 1 so as to enable communication, the host control device comprising:

an installer that installs a driver from a storage of the electronic apparatus operated in the second mode, the driver for operating the electronic apparatus which is operated in the first mode in accordance with an instruction of the host apparatus; and the driver that is installed by the installer, wherein the installer performs a mode switching instruction of performing switching to the first mode on the electronic apparatus which is in the second mode after the driver is installed, and the mode switching instruction corresponds to an access which is an access outside of an operation range of the operation section from the host apparatus and is set as an instruction of mode switching.

7. A system comprising:

an electronic apparatus comprising: a connection section that performs connection with a host apparatus; and an operation section that receives an instruction of the host apparatus to be operated, wherein the operation section includes at least a first mode and a second mode which is different from the first mode, the first mode receiving the instruction of the host apparatus to be operated, and the second mode being operated as a storage of the host apparatus, and the operation section causes the second mode to be switched to the first mode in accordance with whether there is a switching access corresponding to an access to the outside of a range of the storage from the host apparatus; and a host control device comprising: an installer that installs a driver from a storage of the electronic apparatus operated in the second mode, the driver for operating the electronic apparatus which is operated in the first mode in accordance with an instruction of the host apparatus; and the driver that is installed by the installer, wherein the installer performs a mode switching instruction of performing switching to the first mode on the electronic apparatus which is in the second mode after the driver is installed, and the mode switching instruction corresponds to an access which is an access outside of an operation range of the operation section from the host apparatus and is set as an instruction of mode switching, wherein the operation section transmits information regarding the range of the storage to the host apparatus if there is an access for inquiring the range of the storage from the host apparatus, and the operation section considers an access as the switching access and causes the mode to be switched to the first mode if there is the access to the outside of the range of the storage from the host apparatus after transmission.

* * * * *